US008718388B2

(12) United States Patent
Rodriguez et al.

(10) Patent No.: US 8,718,388 B2
(45) Date of Patent: *May 6, 2014

(54) VIDEO PROCESSING WITH TIERED INTERDEPENDENCIES OF PICTURES

(75) Inventors: Arturo A. Rodriguez, Norcross, GA (US); Benjamin M. Cook, Flowery Branch, GA (US); Ken L. Eppinett, Madison, AL (US); John R. Bean, Madison, AL (US)

(73) Assignee: Cisco Technology, Inc., San Jose, CA (US)

( * ) Notice: Subject to any disclaimer, the term of this patent is extended or adjusted under 35 U.S.C. 154(b) by 1149 days.

This patent is subject to a terminal disclaimer.

(21) Appl. No.: 12/333,301

(22) Filed: Dec. 11, 2008

(65) Prior Publication Data

US 2009/0148056 A1    Jun. 11, 2009

Related U.S. Application Data

(60) Provisional application No. 61/007,074, filed on Dec. 11, 2007, provisional application No. 61/013,209, filed on Dec. 12, 2007, provisional application No. 61/032,478, filed on Feb. 29, 2008.

(51) Int. Cl.
*G06K 9/36* (2006.01)
*G06K 9/46* (2006.01)

(52) U.S. Cl.
USPC .......................................................... 382/233

(58) Field of Classification Search
USPC ............. 382/190, 232, 233, 235; 375/240.01, 375/240.12, 240.15, 240.25, 240.26, 375/E07.001, E07.026, E7.093, E7.103, 375/E7.211; 386/347
See application file for complete search history.

(56) References Cited

U.S. PATENT DOCUMENTS

| | | | |
|---|---|---|---|
| 4,764,805 | A | 8/1988 | Rabbani et al. |
| 5,440,345 | A | 8/1995 | Shimoda |
| 5,606,359 | A | 2/1997 | Youden et al. |
| 5,734,443 | A | 3/1998 | O'Grady |
| 5,734,783 | A | 3/1998 | Shimoda et al. |
| 5,828,370 | A | 10/1998 | Moeller et al. |
| 5,854,873 | A | 12/1998 | Mori et al. |
| 5,917,830 | A | 6/1999 | Chen et al. |
| 5,917,988 | A | 6/1999 | Eto |

(Continued)

FOREIGN PATENT DOCUMENTS

| | | |
|---|---|---|
| EP | 0 812 112 A2 | 12/1997 |
| EP | 1 292 138 A2 | 3/2003 |

(Continued)

OTHER PUBLICATIONS

U.S. Appl. No. 12/333,296, filed Dec. 11, 2008, entitled "Inferential Processing to Ascertain Plural Levels of Picture Interdependencies", inventors: Rodriguez et al.

(Continued)

*Primary Examiner* — Amir Alavi
(74) *Attorney, Agent, or Firm* — Merchant & Gould

(57) ABSTRACT

Systems and methods that receive a video stream comprising a sequence of plural compressed pictures, wherein the plural compressed pictures comprises a plurality of sets of compressed pictures, wherein each set in the plurality of sets has a respective picture interdependency characteristic, wherein the compressed pictures in the first set depend for decoding only on pictures from the first set.

20 Claims, 8 Drawing Sheets

(56) References Cited

U.S. PATENT DOCUMENTS

| | | |
|---|---|---|
| 5,943,447 A | 8/1999 | Tkhor et al. |
| 5,949,948 A | 9/1999 | Krause et al. |
| 5,963,260 A | 10/1999 | Bakhmutsky |
| 5,970,028 A | 10/1999 | Shimabukuro |
| 6,160,889 A | 12/2000 | Yagasaki |
| 6,188,436 B1 | 2/2001 | Williams et al. |
| 6,201,927 B1 | 3/2001 | Commer |
| 6,222,979 B1 | 4/2001 | Willis et al. |
| 6,263,022 B1 | 7/2001 | Chen et al. |
| 6,304,714 B1 | 10/2001 | Krause et al. |
| 6,310,915 B1 | 10/2001 | Wells et al. |
| 6,393,057 B1 | 5/2002 | Thoreau et al. |
| 6,411,725 B1 | 6/2002 | Rhoads |
| 6,421,387 B1 | 7/2002 | Rhee |
| 6,512,552 B1 | 1/2003 | Subramanian |
| 6,587,506 B1 | 7/2003 | Noridomi |
| 6,594,798 B1 | 7/2003 | Chou et al. |
| 6,643,327 B1 | 11/2003 | Wang |
| 6,658,199 B1 | 12/2003 | Hallberg |
| 6,754,373 B1 | 6/2004 | de Cuetos et al. |
| 6,785,289 B1 | 8/2004 | Ward et al. |
| 6,806,909 B1 | 10/2004 | Radha et al. |
| 6,906,743 B1 | 6/2005 | Maurer |
| 6,907,075 B2 | 6/2005 | Felts et al. |
| 6,909,743 B1 | 6/2005 | Ward et al. |
| 6,912,251 B1 | 6/2005 | Ward et al. |
| 6,980,594 B2 | 12/2005 | Wang et al. |
| 7,027,713 B1 | 4/2006 | Hallberg |
| 7,050,603 B2 | 5/2006 | Rhoads et al. |
| 7,053,874 B2 | 5/2006 | Koyama |
| 7,085,322 B2 | 8/2006 | Ngai et al. |
| 7,095,783 B1 | 8/2006 | Sotheran et al. |
| 7,096,481 B1 | 8/2006 | Forecast et al. |
| 7,129,962 B1 | 10/2006 | Cote et al. |
| 7,185,018 B2 | 2/2007 | Archbold |
| 7,225,319 B2 | 5/2007 | Toma et al. |
| 7,236,520 B2 | 6/2007 | Kim et al. |
| 7,239,801 B2 | 7/2007 | Himeno et al. |
| 7,243,193 B2 | 7/2007 | Walmsley |
| 7,317,839 B2 | 1/2008 | Holcomb |
| 7,376,335 B2 | 5/2008 | De Haan |
| 7,397,858 B2 | 7/2008 | Garrido et al. |
| 7,480,335 B2 * | 1/2009 | Payson ............ 375/240.25 |
| 7,577,198 B2 | 8/2009 | Holcomb |
| 7,584,495 B2 | 9/2009 | Hannuksela et al. |
| 7,586,924 B2 | 9/2009 | Wiegand |
| 7,590,180 B2 | 9/2009 | Kang |
| 7,599,435 B2 | 10/2009 | Marpe et al. |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,649,937 B2 | 1/2010 | Rabenold et al. |
| 7,656,410 B2 | 2/2010 | Chiu |
| 7,720,145 B2 | 5/2010 | Muthukrishnan et al. |
| 7,733,910 B2 | 6/2010 | Mace et al. |
| 7,809,059 B2 | 10/2010 | Yin et al. |
| 7,809,060 B2 | 10/2010 | Toma et al. |
| 7,889,788 B2 | 2/2011 | Toma et al. |
| 7,903,743 B2 | 3/2011 | Ho |
| 8,136,140 B2 | 3/2012 | Hodge |
| 8,155,207 B2 | 4/2012 | Rodriguez et al. |
| 8,259,814 B2 | 9/2012 | Rodriguez et al. |
| 8,259,817 B2 | 9/2012 | Rodriguez et al. |
| 8,265,154 B2 | 9/2012 | Gardner |
| 8,320,465 B2 | 11/2012 | Rodriguez et al. |
| 8,326,131 B2 | 12/2012 | Rodriguez |
| 8,416,858 B2 | 4/2013 | Rodriguez et al. |
| 8,416,859 B2 | 4/2013 | Rodriguez |
| 2002/0071485 A1 | 6/2002 | Caglar et al. |
| 2002/0075402 A1 | 6/2002 | Robson et al. |
| 2002/0133819 A1 | 9/2002 | Jackson |
| 2002/0149591 A1 | 10/2002 | Van Der Vleuten et al. |
| 2002/0162111 A1 | 10/2002 | Shimizu et al. |
| 2002/0176025 A1 | 11/2002 | Kim |
| 2002/0178444 A1 | 11/2002 | Trajkovic et al. |
| 2003/0012554 A1 | 1/2003 | Zeidler et al. |
| 2003/0016876 A1 | 1/2003 | Chai et al. |
| 2003/0043847 A1 | 3/2003 | Haddad |
| 2003/0067479 A1 | 4/2003 | Jung et al. |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0123849 A1 | 7/2003 | Nallur |
| 2003/0161407 A1 | 8/2003 | Murdock et al. |
| 2003/0189982 A1 * | 10/2003 | MacInnis ............ 375/240.24 |
| 2003/0195977 A1 | 10/2003 | Liu et al. |
| 2004/0012510 A1 | 1/2004 | Chen |
| 2004/0078186 A1 | 4/2004 | Nair |
| 2004/0128578 A1 | 7/2004 | Jonnalagadda |
| 2004/0133908 A1 | 7/2004 | Smith |
| 2004/0139462 A1 | 7/2004 | Hannuksela et al. |
| 2004/0177369 A1 | 9/2004 | Akins |
| 2004/0179619 A1 | 9/2004 | Tian et al. |
| 2004/0210925 A1 | 10/2004 | Miyazawa et al. |
| 2004/0218816 A1 | 11/2004 | Hannuksela |
| 2004/0257472 A1 | 12/2004 | Mpr et al. |
| 2005/0002574 A1 | 1/2005 | Fukuhara et al. |
| 2005/0013249 A1 | 1/2005 | Kong et al. |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0069212 A1 | 3/2005 | Bottreau et al. |
| 2005/0084166 A1 | 4/2005 | Boneh et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0226323 A1 | 10/2005 | Secker |
| 2005/0226325 A1 | 10/2005 | Dei et al. |
| 2005/0226327 A1 | 10/2005 | Kim |
| 2005/0229225 A1 | 10/2005 | Klausberger et al. |
| 2005/0254498 A1 | 11/2005 | Itoh |
| 2005/0281329 A1 | 12/2005 | Chin |
| 2006/0013305 A1 * | 1/2006 | Sun ............ 375/240.12 |
| 2006/0036551 A1 | 2/2006 | Oliveira et al. |
| 2006/0072597 A1 | 4/2006 | Hannuksela |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0109856 A1 | 5/2006 | Deshpande |
| 2006/0117357 A1 | 6/2006 | Surline |
| 2006/0120463 A1 | 6/2006 | Wang |
| 2006/0126728 A1 | 6/2006 | Yu et al. |
| 2006/0129914 A1 | 6/2006 | Ellis |
| 2006/0132822 A1 | 6/2006 | Walmsley |
| 2006/0133645 A1 | 6/2006 | Rhoads et al. |
| 2006/0147121 A1 | 7/2006 | Maeda et al. |
| 2006/0170571 A1 | 8/2006 | Martinian et al. |
| 2006/0188169 A1 | 8/2006 | Tener et al. |
| 2006/0222319 A1 | 10/2006 | Russ |
| 2006/0224763 A1 | 10/2006 | Altunbasak et al. |
| 2006/0262861 A1 | 11/2006 | Kobayashi |
| 2006/0294171 A1 | 12/2006 | Bossen |
| 2007/0019724 A1 | 1/2007 | Tourapis |
| 2007/0025688 A1 | 2/2007 | Pejhan |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0053665 A1 | 3/2007 | Kato |
| 2007/0081586 A1 | 4/2007 | Raveendran et al. |
| 2007/0091997 A1 | 4/2007 | Fogg et al. |
| 2007/0106760 A1 | 5/2007 | Houh et al. |

(56) References Cited

U.S. PATENT DOCUMENTS

| | | |
|---|---|---|
| 2007/0109409 A1 | 5/2007 | Yea |
| 2007/0112721 A1 | 5/2007 | Archbold |
| 2007/0116277 A1 | 5/2007 | Ro et al. |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0147686 A1 | 6/2007 | Joshi |
| 2007/0153679 A1 | 7/2007 | Jost et al. |
| 2007/0153916 A1 | 7/2007 | Demircin et al. |
| 2007/0172133 A1 | 7/2007 | Kim |
| 2007/0183494 A1 | 8/2007 | Hannuksela |
| 2007/0194975 A1* | 8/2007 | Jang et al. ............... 341/178 |
| 2007/0223595 A1 | 9/2007 | Hannuksela et al. |
| 2007/0230496 A1 | 10/2007 | Guo et al. |
| 2007/0245382 A1 | 10/2007 | Doi et al. |
| 2007/0280350 A1 | 12/2007 | Mathew et al. |
| 2008/0022340 A1 | 1/2008 | Hannuksela et al. |
| 2008/0025399 A1* | 1/2008 | Le Leannec et al. .... 375/240.16 |
| 2008/0037658 A1 | 2/2008 | Price et al. |
| 2008/0037957 A1 | 2/2008 | Nallur et al. |
| 2008/0055463 A1 | 3/2008 | Lerner |
| 2008/0056383 A1 | 3/2008 | Ueki et al. |
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137728 A1 | 6/2008 | Van Der Stok et al. |
| 2008/0137742 A1 | 6/2008 | Chen |
| 2008/0141091 A1 | 6/2008 | Kalluri |
| 2008/0151101 A1 | 6/2008 | Tian et al. |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0219393 A1 | 9/2008 | Toma et al. |
| 2008/0225850 A1 | 9/2008 | Oran et al. |
| 2008/0225951 A1 | 9/2008 | Young |
| 2008/0247463 A1 | 10/2008 | Buttimer |
| 2008/0256409 A1 | 10/2008 | Oran et al. |
| 2008/0260045 A1 | 10/2008 | Rodriguez et al. |
| 2008/0273596 A1 | 11/2008 | Oguz et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Shuh |
| 2009/0028447 A1 | 1/2009 | Yatabe et al. |
| 2009/0034627 A1 | 2/2009 | Rodriguez et al. |
| 2009/0034633 A1 | 2/2009 | Rodirguez et al. |
| 2009/0073928 A1 | 3/2009 | Power |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1* | 6/2009 | Rodriguez et al. ............ 382/235 |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0199231 A1 | 8/2009 | Tsuria et al. |
| 2009/0201988 A1 | 8/2009 | Gazier et al. |
| 2009/0207904 A1 | 8/2009 | Pandit et al. |
| 2009/0210412 A1 | 8/2009 | Oliver |
| 2009/0214178 A1 | 8/2009 | Takahashi |
| 2009/0220012 A1* | 9/2009 | Rodriguez et al. ....... 375/240.25 |
| 2009/0226105 A1 | 9/2009 | Huang |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez et al. |
| 2009/0313662 A1 | 12/2009 | Rodriguez |
| 2009/0313668 A1 | 12/2009 | Shepherd |
| 2009/0323822 A1 | 12/2009 | Rodriguez et al. |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1* | 2/2010 | Franceschini et al. ........ 370/232 |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0088717 A1 | 4/2010 | Candelore et al. |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0293571 A1 | 11/2010 | Rodriguez |
| 2010/0322302 A1 | 12/2010 | Rodriguez |
| 2011/0222837 A1* | 9/2011 | Walton et al. ................. 386/347 |
| 2013/0028314 A1 | 1/2013 | Rodriguez et al. |

FOREIGN PATENT DOCUMENTS

| | | |
|---|---|---|
| EP | 1 328 119 A1 | 7/2003 |
| EP | 1480460 A1 | 11/2004 |
| JP | 05-236465 A | 9/1993 |
| KR | 10-2004-0054708 | 6/2004 |
| WO | WO 00/00981 A2 | 1/2000 |
| WO | WO 00/62552 A2 | 10/2000 |
| WO | 01/01702 | 1/2001 |
| WO | 01/43440 | 6/2001 |
| WO | 01/63774 | 8/2001 |
| WO | WO 2004/102571 A1 | 11/2004 |
| WO | WO 2005/106875 A1 | 11/2005 |
| WO | WO 2006/083824 A2 | 8/2006 |
| WO | 2006/101979 | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

U.S. Final Office Action in U.S. Appl. No. 11/627,452 dated Mar. 4, 2011.

U.S. Non-Final Office Action in U.S. Appl. No. 11/831,916 dated Mar. 31, 2011.

U.S. Non-Final Office Action in U.S. Appl. No. 12/417,869 dated Apr. 4, 2011.

U.S. Appl. No. 12/709,851, filed Feb. 22, 2010 entitled "Signalling of Decodable Sub-Sequences", Inventor: Arturo A. Rodriguez.

U.S. Appl. No. 12/713,153, filed Feb. 25, 2010 entitled "Signalling of Auxiliary Information that Assists Processing of Video According to Various Formats", Inventors: Rodriguez et al.

U.S. Appl. No. 12/722,117, filed Mar. 11, 2010 entitled "Management of Picture Referencing in Video Streams for Plural Playback Modes", Inventors: Walton et al.

(56) References Cited

OTHER PUBLICATIONS

Hurst et al., "MPEG Splicing Tutorial and Proposed SMPTE Standard", Proceedings of the SMPTE Technical Conference, Nov. 1997, pp. 105-117.
International Preliminary Report on Patentability and Written Opinion dated Feb. 2, 2010 cited in International Application No. PCT/US2008/071111.
U.S. Non-Final Office Action dated Feb. 1, 2010 in U.S. Appl. No. 11/831,916.
International Search Report and Written Opinion dated Apr. 15, 2010 cited in International Application No. PCT/US2010/024927.
European Examination dated May 4, 2010 in Application No. 07 844 937.8.
International Search Report and Written Opinion issued in International Application No. PCT/US2007/083867 mailed May 23, 2008.
MacInnis, A. et al., "NAL for AVC Video with MPEG-2 Systems," Video Standards and Drafts, pp. 1-11 (Mar. 2002).
Stuhlmuller, Klaus, et al., "Analysis of Video Transmission over Lossy Channels"; IEEE Journal on Selected Areas in Communication, vol. 18, No. 6, Jun. 2000, pp. 1012-1032.
PCT Search Report cited in International Appln No. PCT/US2009/064180 mailed Jan. 8, 2010.
PCT Written Opinion cited in International Appln No. PCT/US2009/064180 mailed Jan. 8, 2010.
PCT Search Report cited in International Appln No. PCT/US2009/047521 mailed Dec. 22, 2009.
PCT Written Opinion cited in International Appln No. PCT/US2009/047521 mailed Dec. 22, 2009.
European Examination dated Sep. 16, 2010 in Application No. 08 796 875.6.
U.S. Non-Final Office Action in U.S. Appl. No. 11/627,452 dated Nov. 10, 2010.
U.S. Non-Final Office Action in U.S. Appl. No. 11/831,916 dated Aug. 4, 2010.
Canadian Office Action dated Dec. 11, 2009 in Application No. 2,533,169.
U.S. Appl. No. 12/779,035, filed May 12, 2010 entitled "Signalling Buffer Characteristics for Slicing Operations of Video Streams", Inventors: Rodriguez et al.
U.S. Appl. No. 12/417,864, filed Apr. 3, 2009, entitled "System and Method for Authorization of Segment Boundary Notifications."
U.S. Appl. No. 12/492,117, filed Jun. 25, 2009, entitled "Support for Blocking Trick Mode Operations."
U.S. Appl. No. 12/483,925, filed Jun. 12, 2009, entitled "Picture Interdependencies Signals in Context of MMCO to Assist Stream Manipulation."
U.S. Appl. No. 12/417,868, filed Apr. 3, 2009, entitled "Segment Boundary Notification to a Digital Media Receiver."
ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.
Tian et al., "Sub-Sequence Video Coding for Improved Temporal Scalability", 4 pages, 2007.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Amon et al., "File Format for Scalable Video Coding", IEEE Transactions on Circuits and Systems for Video Technology, vol. 17 No. 9, Sep. 2007, pp. 1174-1185.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I_PDF_E.pdf, XP007905991, pp. 1-76.
"Splice Points for MPEG-2 Transport Streams", SMPTE Journal, SMPTE Inc., vol. 107 No. Oct. 1998, XP-000793004, pp. 916-925.
Rodriguez et al., "SEI message to convey suitable splice points in the bitstream", JVT Meeting, Document JVT-Z040, Filename JVT-Z040.doc, XP-30007329, Jan. 2008, pp. 1-8.
Luo et al., "On HRD conformance for splice bitstreams", JVT Meeting, Document JVT-V055r1, Filename JVT-V055r1.doc, XP-30006863, Jan. 2007, pp. 1-11.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
U.S. Non-Final Office Action dated Dec. 28, 2007 in U.S. Appl. No. 10/623,683.
U.S. Final Office Action dated Jul. 25, 2008 in U.S. Appl. No. 10/623,683.
European Communication dated Aug. 9, 2011 in Application No. 08 838 787.3.
European Communication dated Dec. 14, 2011 in Application No. 09 751 294.1.
U.S. Non-Final Office Action in U.S. Appl. No. 12/417,864 dated Apr. 18, 2011.
U.S. Final Office Action mailed Jul. 5, 2011 in U.S. Appl. No. 12/417,864.
U.S. Non-Final Office Action mailed Aug. 5, 2011 in U.S. Appl. No. 11/831,906.
U.S. Final Office Action mailed Aug. 5, 2011 in U.S. Appl. No. 12/417,869.
U.S. Non-Final Office Action mailed Sep. 14, 2011 in U.S. Appl. No. 12/124,779.
U.S. Non-Final Office Action mailed Sep. 22, 2011 in U.S. Appl. 11/831,912.
U.S. Final Office Action mailed Sep. 28, 2011 in U.S. Appl. No. 11/831,916.
U.S. Non-Final Office Action mailed Nov. 10, 2011 in U.S. Appl. No. 12/483,925.
U.S. Non-Final Office Action mailed Nov. 23, 2011 in U.S. Appl. No. 12/141,015.
U.S. Non-Final Office Action mailed Nov. 29, 2011 in U.S. Appl. No. 12/492,117.
U.S. Non-Final Office Action mailed Nov. 23, 2011 in U.S. Appl. No. 12/141,017.
U.S. Non-Final Office Action mailed Dec. 21, 2012 in U.S. Appl. No. 12/333,296.
U.S. Non-Final Office Action mailed Dec. 22, 2011 in U.S. Appl. No. 12/617,043.
U.S. Non-Final Office Action mailed Dec. 27, 2011 in U.S. Appl. No. 12/417,869.
U.S. Non-Final Office Action mailed Dec. 27, 2011 in U.S. Appl. No. 12/252,632.
U.S. Non-Final Office Action mailed Jan. 4, 2012 in U.S. Appl. No. 12/617,062.
Chinese First Office Action mailed Feb. 21, 2013 in Application No. 200980145072.2, 16 pages.
U.S. Non-Final Office Action mailed Jun. 25, 2012 in U.S. Appl. No. 12/417,868, 37 pages.
U.S. Non-Final Office Action mailed Aug. 10, 2012 in U.S. Appl. No. 12/483,925, 35 pages.
U.S. Non-Final Office Action mailed Sep. 13, 2012 in U.S. Appl. No. 12/141,015, 22 pages.
U.S. Non-Final Office Action mailed Oct. 2, 2012 in U.S. Appl. No. 12/417,864, 17 pages.
U.S. Non-Final Office Action mailed Oct. 22, 2012 in U.S. Appl. No. 12/779,035, 33 pages.

(56) References Cited

OTHER PUBLICATIONS

U.S. Final Office Action mailed Nov. 23, 2012 in U.S. Appl. No. 12/417,869, 16 pages.
U.S. Final Office Action mailed Nov. 27, 2012 in U.S. Appl. No. 12/616,991, 34 pages.
U.S. Final Office Action mailed Dec. 19, 2012 in U.S. Appl. No. 12/722,117, 24 pages.
U.S. Final Office Action mailed Jan. 4, 2013 in U.S. Appl. No. 12/417,868, 19 pages.
U.S. Non-Final Office Action mailed Jan. 24, 2013 in U.S. Appl. No. 12/713,153, 41 pages.
U.S. Non-Final Office Action mailed Feb. 26, 2013 in U.S. Appl. No. 12/617,043, 31 pages.
U.S. Final Office Action mailed Feb. 26, 2013 in U.S. Appl. No. 12/141,019, 14 pages.
U.S. Final Office Action mailed Feb. 28, 2013 in U.S. Appl. No. 12/483,925, 37 pages.
U.S. Final Office Action mailed Mar. 18, 2013 in U.S. Appl. No. 12/141,015, 23 pages.
U.S. Final Office Action mailed Mar. 18, 2013 in U.S. Appl. No. 12/417,864, 13 pages.
U.S. Non-Final Office Action mailed Mar. 20, 2013 in U.S. Appl. No. 11/831,912, 17 pages.
U.S. Non-Final Office Action mailed Apr. 9, 2013 in U.S. Appl. No. 121/831,906, 22 pages.
U.S. Non-Final Office Action mailed Apr. 9, 2013 in U.S. Appl. No. 12/492,117, 20 pages.
U.S. Non-Final Office Action mailed Apr. 9, 2013 in U.S. Appl. No. 11/627,452, 11 pages.
Yao Wang et al., "Error Control and Concealment for Video Communication: A Review," Proceedings of the IEEE, New York, vol. 86, No. 5, May 1, 1998, 24 pages.
European Communication dated Sep. 22, 2011 in Application No. 08796584.4, 9 pages.
Chinese First Office Action mailed Dec. 31, 2011 in Application No. 200880121233.X, 7 pages.
Canadian Office Action dated Jun. 6, 2012 in Application No. 2,669,552, 3 pages.
European Communication dated Jul. 5, 2012 in Application No. 08838787.3, 6 pages.
Supplementary European Search Report dated Jul. 17, 2012 in Application No. 09826735, 3 pages.
U.S. Non-Final Office Action mailed Jan. 18, 2012 in U.S. Appl. No. 12/617,015, 31 pages.
U.S. Final Office Action mailed Jan. 19, 2012 in U.S. Appl. No. 12/124,779, 12 pages.
U.S. Final Office Action mailed Feb. 17, 2012 in U.S. Appl. No. 11/627,452, 11 pages.
U.S. Non-Final Office Action mailed Mar. 8, 2012 in U.S. Appl. No. 12/351,776, 31 pages.
U.S. Final Office Action mailed Mar. 13, 2012 in U.S. Appl. No. 11/831,906, 24 pages.
U.S. Final Office Action mailed Mar. 19, 2012 in U.S. Appl. No. 11/831,912, 20 pages.
U.S. Non-Final Office Action mailed Mar. 26, 2012 in U.S. Appl. No. 12/395,676, 37 pages.
U.S. Non-Final Office Action mailed Apr. 23, 2012 in U.S. Appl. No. 12/709,851, 29 pages.
U.S. Non-Final Office Action mailed Apr. 25, 2012 in U.S. Appl. No. 12/141,019, 28 pages.
U.S. Final Office Action mailed May 11, 2012 in U.S. Appl. No. 12/141,015, 25 pages.
U.S. Final Office Action mailed May 18, 2012 in U.S. Appl. No. 12/492,117, 17 pages.
U.S. Non-Final Office Action mailed May 23, 2012 in U.S. Appl. No. 12/616,974, 30 pages.
U.S. Final Office Action mailed May 23, 2012 in U.S. Appl. No. 12/333,296, 21 pages.
U.S. Final Office Action mailed Jun. 11, 2012 in U.S. Appl. No. 12/141,017, 23 pages.
U.S. Final Office Action mailed Jun. 4, 2012 in U.S. Appl. No. 12/252,632, 22 pages.
U.S. Non-Final Office Action mailed Jun. 15, 2012 in U.S. Appl. No. 12/124,779, 12 pages.
U.S. Non-Final Office Action mailed Jun. 20, 2012 in U.S. Appl. No. 12/722,117, 30 pages.
U.S. Final Office Action mailed Jul. 6, 2012 in U.S. Appl. No. 12/617,043, 26 pages.
U.S. Non-Final Office Action mailed Jul. 10, 2012 in U.S. Appl. No. 12/417,869, 8 pages.
U.S. Final Office Action mailed Jul. 16, 2012 in U.S. Appl. No. 12/351,776, 6 pages.
U.S. Non-Final Office Action mailed Jul. 18, 2012 in U.S. Appl. No. 12/616,991.
D.T. Nguyen and J. Ostermann, "Congestion Control using Scalable Video Coding based on H. 264/AVC," IEEE Journal of Selected Topics in Signal Processing, vol. 1 No. 2, Aug. 2007, 8 pages.
Digital Video Image Quality and Perceptual Coding edited by H.R. Wu and K.R. Rao, CRC Press 2005, pp. 503-541.
Author Unknown, SMPTE Standard for Television—Splice Points for MPEG-2 Transport Streams, The Society of Motion Picture and Television Engineers, Copyright 1999, http://www.ietf.org/mail-archive/web/avtext/current/pdf6u0ckuE66s.pdf, accessed May 30, 2012, 20 pages.
Hannuksela et al., "H.264/AVC Video for Wireless Transmission," IEEE Wireless Communications, IEEE Service Center, Piscataway, NJ, US, vol. 12, No. 4, Aug. 1, 2005, pp. 6-13.
Psannis K. et al., "Efficient Flexible Macroblock Ordering Technique," IEICE Transactions on Communications, Communications Society, Tokyo JP, vol. E19B, No. 8, Aug. 1, 2008, pp. 2692-2701.
Tom A. S. et al., "Packet Video for Cell Loss Protection Using Deinterleaving and Scrambling," Speech Processing 1. Toronto, May 14-17, 1991; [International Conference on Acoustics, Speech & Signal Processing. ICASSP], New York, IEEE, US, vol. CONF. 16, Apr. 14, 1991, pp. 2857-2860.
Schwarz H. et al., "SVC Overview," 21. JVT Metting; 78. MPEG Meeting; Oct. 20, 2006- Oct. 27, 2006; Hangzhou CN; (Joint Video Team of ISO/IEC JTC1/SC29/WG11 and ITU-T SG.16), No. JVT-U145, Oct. 20, 2006, 20 pages.
European Communication dated Mar. 22, 2013 in Application No. 09 826 735.4, 7 pages.
European Communication dated Mar. 22, 2013 in Application No. 09 767 598.7, 5 pages.
European Communication dated Oct. 15, 2013 in Application No. 09 767 598.7, 6 pages.
U.S. Final Office Action mailed Apr. 8, 2013 in U.S. Appl. No. 12/779,035, 19 pages.
U.S. Final Office Action mailed Jun. 6, 2013 in U.S. Appl. No. 12/617,043, 27 pages.
U.S. Final Office Action mailed Jun. 19, 2013 in U.S. Appl. No. 12/713,153, 19 pages.
U.S. Non-Final Office Action mailed Jun. 21, 2013 in U.S. Appl. No. 12/483,925, 40 pages.
U.S. Non-Final Office Action mailed Jul. 3, 2013 in U.S. Appl. No. 13/443,580, 25 pages.
U.S. Non-Final Office Action mailed Jul. 16, 2013 in U.S. Appl. No. 12/33,296, 32 pages.
U.S. Non-Final Office Action mailed Jul. 18, 2013 in U.S. Appl. No. 12/417,864, 14 pages.
U.S. Final Office Action mailed Sep. 6, 2013 in U.S. Appl. No. 12/492,117, 27, pages.
U.S. Non-Final Office Action mailed Sep. 11, 2013 in U.S. Appl. No. 12/722,117, 21 pages.
Zhu et al., "Coding and Cell-Loss Recovery in DCT-Based Packet Video," IEEE Transactions on Circuits and Systems for Video Technology, Jun. 3, 1993, New York U.S., 11 pages.

* cited by examiner

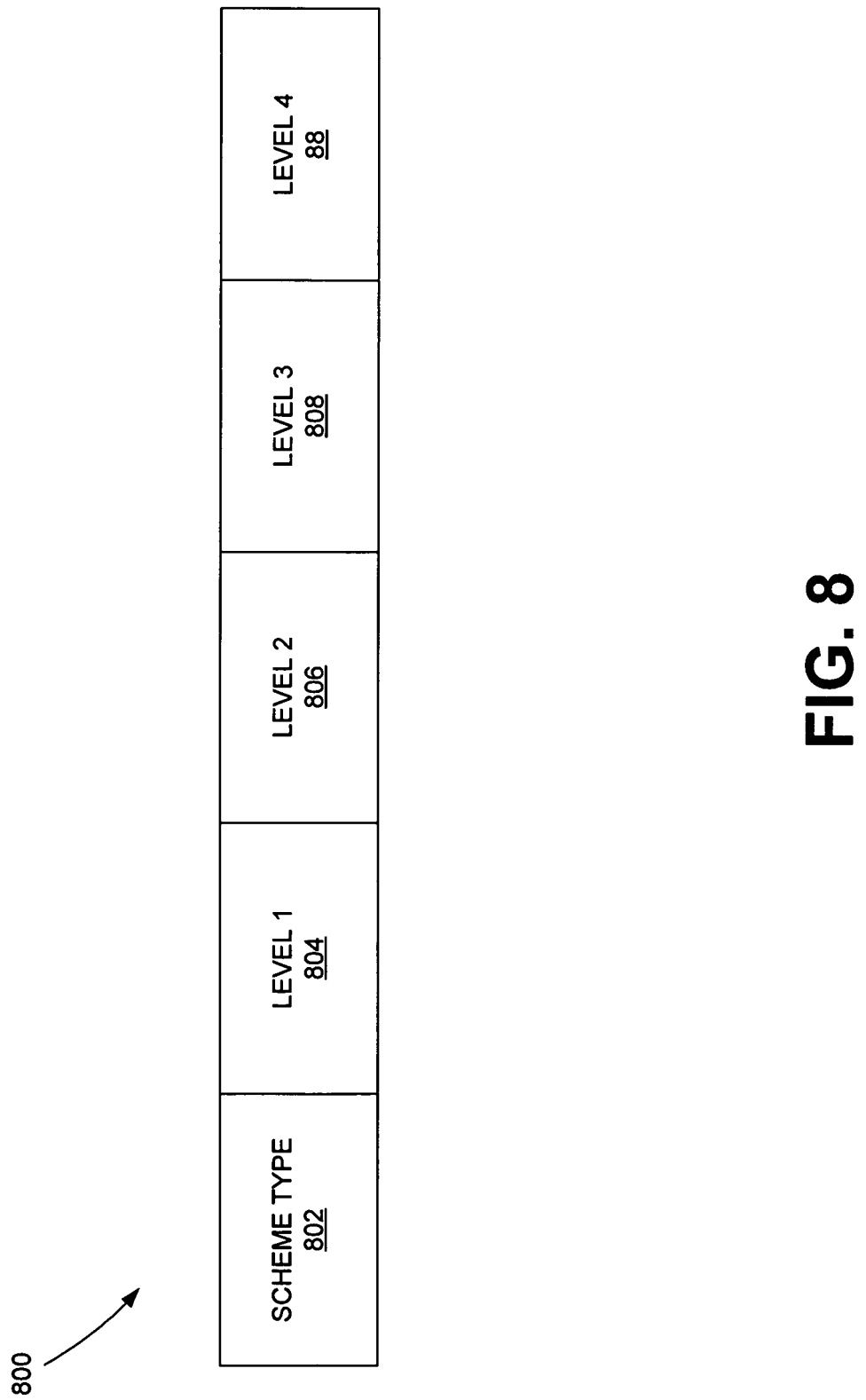

ated to processing

VIDEO PROCESSING WITH TIERED INTERDEPENDENCIES OF PICTURES

CROSS-REFERENCE TO RELATED APPLICATIONS

This application claims priority to, and seeks the benefit of, U.S. provisional application entitled, "Communicating Auxiliary Information for PVR Functions," having Ser. No. 61/007,074, filed Dec. 11, 2007, U.S. provisional application entitled, "Video Processing With Tiered Interdependencies of Pictures," having Ser. No. 61/013,209, filed Dec. 12, 2007, and U.S. provisional application entitled, "Stream Identification," having Ser. No. 61/032,478, filed Feb. 29, 2008, all three of which are entirely incorporated herein by reference.

This application is related to copending U.S. utility application entitled, "Indicating Picture Usefulness for Playback Optimization," having Ser. No. 11/831,916, filed Jul. 31, 2007, which claims priority to U.S. Provisional Application entitled, "System and Method for Signaling Characteristics of Pictures' Interdependencies," having Ser. No. 60/865,644, filed Nov. 13, 2006, both of which are entirely incorporated herein by reference.

This application is related to copending U.S. utility application entitled, "System and Method for Signaling Characteristics of Pictures' Interdependencies, having Ser. No. 11/627,452, filed Jan. 26, 2007, which claims priority to U.S. Provisional Application entitled, "System and Method for Signaling Characteristics of Pictures' Interdependencies," having Ser. No. 60/865,644, filed Nov. 13, 2006, both of which are entirely incorporated herein by reference.

TECHNICAL FIELD

Particular embodiments are generally related to processing video streams in network systems.

BACKGROUND

The implementation of digital video with an advanced video compression method is expected to extend the same level of usability and functionality that established compression methods extend to applications and network systems. Video processing devices throughout the network systems should continue to be provisioned with existing levels of video stream manipulation capabilities or better.

When providing video stream manipulation functionality for video streams compressed and formatted in accordance with the Advanced Video Coding (AVC) standard, referred to herein as AVC streams, it becomes difficult to determine whether the video stream is suitable for a particular stream manipulation operation or for operations extending end user functionality such as different video playback modes. Likewise, it becomes difficult for video processing equipment located at any of several locations throughout a network system to fulfill manipulation operations on AVC streams. This is because the AVC standard generally has a rich set of compression tools and can exploit temporal redundancies among pictures in more elaborate and comprehensive ways than prior video coding standards.

AVC streams are more efficiently compressed than video streams coded with prior video coding standards. However, AVC streams tend to exhibit higher complexities in pictures' interdependencies that make it difficult to fulfill stream manipulation operations.

BRIEF DESCRIPTION OF THE DRAWINGS

FIG. 8 is a block diagram that illustrates an embodiment of a data structure used to communicate whether a picture level is enabled or not.

DESCRIPTION OF EXAMPLE EMBODIMENTS

Overview

Figure 1:
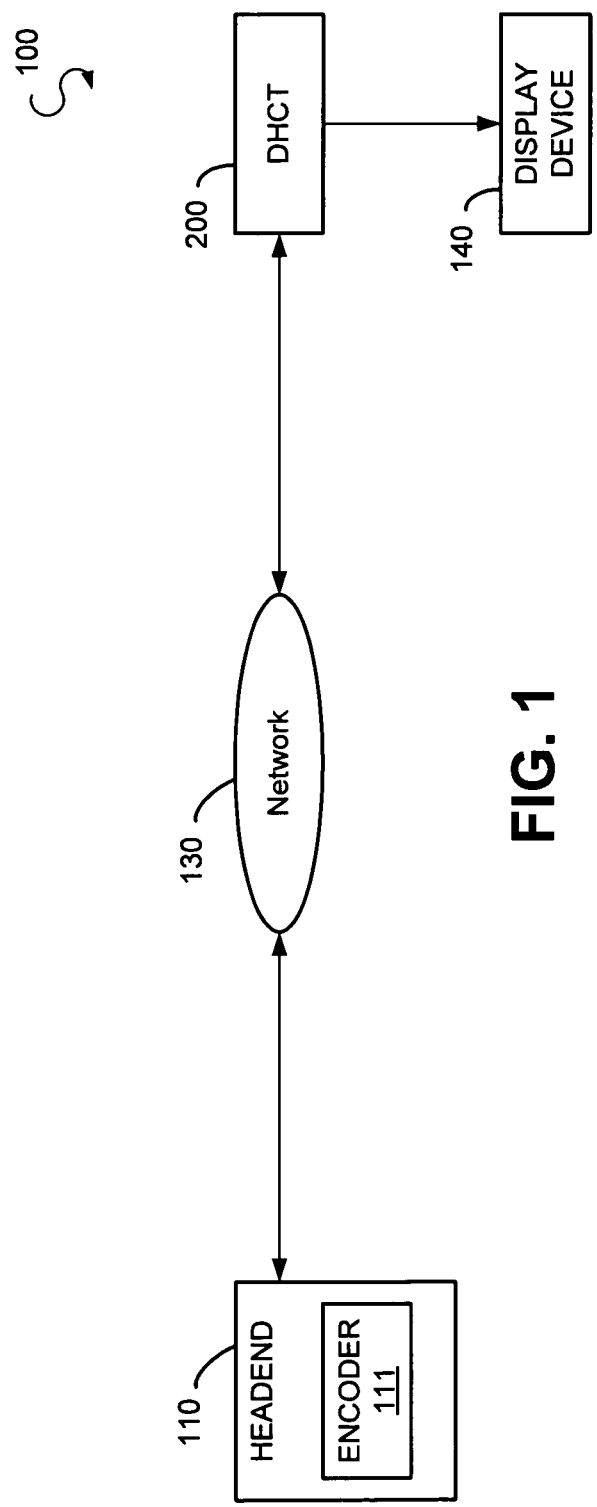
FIG. 1 is a high-level block diagram depicting an example environment in which an embodiment of systems and methods that implement processing of compressed video having tiered interdependencies and inferential processing to ascertain plural levels of picture interdependencies.

Embodiments of systems and methods are disclosed that receive a video stream comprising a sequence of plural compressed pictures, wherein the plural compressed pictures comprises a plurality of sets of compressed pictures, wherein each set in the plurality of sets has a respective picture interdependency characteristic, wherein the compressed pictures in the first set depend for decoding only on pictures from the first set.

Example Embodiments

In certain example embodiments disclosed herein, a system of tiered interdependencies of pictures has a hierarchy of "T" tiers and comprises of coded pictures in a video stream (e.g., AVC stream) that adhere to one of the T tiers. In one embodiment, the first tier, or Tier-1, consists of the most important coded pictures in the video stream and each subsequent tier corresponds to the next most important coded pictures in the video stream. The T-th tier contains the least important coded pictures in the video stream (e.g., discardable pictures). In an alternate embodiment, the least important pictures in a video stream are pictures not associated with any of the T tiers and thus indirectly belong to the T+1 tier.

In an alternate embodiment, the first tier, or Tier-1, consists of coded pictures in the video stream that when extracted progressively from the video stream can be decoded and output independently of all other coded pictures in the video stream (e.g., pictures in all other tiers). The second tier, or Tier-2, consists of coded pictures in the video stream that when extracted progressively from the video stream can be decoded and output independently of other coded pictures in the video stream that are "determined not to belong to" or "not classified" as Tier-1 or Tier-2 coded pictures (e.g., output independently of pictures Tier-3 through the last tier). More generally, for any value of K from 1 to T, coded pictures classified as, or determined to belong to, Tier-K can be independently decoded and output by extracting progressively all coded pictures in the video stream if they are classified as or determined to belong to one of the tiers among Tiers 1 through K. Thus, if in a progressive manner "all" the pictures belonging to Tiers 1 through K are: (1) extracted from the video stream, and (2) decoded, then the next picture in the video stream that is classified or belongs to one of tiers in Tier-1 through Tier-K can be extracted and decoded because all of the pictures that it depends on or references as reference pictures will have been: (1) extracted from the video stream, (2) decoded and (3) available to be referenced.

A Tier-K coded picture in the video stream can be extracted and guaranteed to be decoded into its intended complete and full reconstruction if extraction and decoding of all immediately-preceding Tier-K coded pictures has been performed progressively for a finite amount of time prior to the extraction of that particular Tier-K coded picture. For instance, a Tier-K picture is decodable if all immediately-preceding Tier-1 through Tier-K pictures in an AVC stream have been extracted and decoded progressively from some starting point. In one embodiment, a Tier-K coded picture can be extracted and decoded in its intended complete and full reconstruction if all coded pictures belonging to tiers Tier-1 through Tier-K have been extracted and decoded progressively since or for at least the last "n" Random Access Points (RAPs) in the video stream immediately prior to the particular Tier-K coded picture. For instance, a Tier-K picture is decodable if a sufficient number of prior pictures in a bitstream have been extracted progressively (e.g., since the last two RAPs). RAPs can be signaled at the MPEG-2 Transport level or layer. For instance, specifications such as MPEG-2 Systems provision indicators in the transport stream, such as a random access point indicator and/or a priority indicator, which serve to signal a RAP. RAPs may be also as defined in ETSI TS 102 054 or SCTE 128 2007. Note that a picture is decodable if all its reference pictures, sequence parameter sets (SPS), and picture parameter sets (PPS) have been extracted.

In an alternate embodiment, a Tier-K coded picture can be extracted and decoded in its intended complete and full reconstruction if all coded pictures belonging to tiers Tier-1 through Tier-K have been extracted and decoded progressively since or for at least the last "n" beginnings of Group of Pictures (GOPs) in the video stream immediately prior to the particular Tier-K coded picture. Alternatively, the guarantee for a complete and full reconstruction of the coded picture may require that the processing of the last "n" complete GOPs in the video stream that are immediately prior to the particular Tier-K coded picture.

In yet another embodiment, a Tier-K coded picture can be extracted and decoded in its intended complete and full reconstruction if all coded pictures belonging to tiers Tier-1 through Tier-K have been extracted and decoded progressively after at least the decoding of "n" 1 pictures or IDR pictures in the video stream prior to the extraction of particular Tier-K coded picture. In one embodiment "n" may have a first value for consecutive I pictures and a second value for consecutive IDR pictures.

In yet another embodiment, a Tier-K coded picture can be extracted and decoded in its intended complete and full reconstruction if at least G consecutive coded pictures belonging to tiers among Tier-1 through Tier-K, and immediately prior to the particular coded picture in the video stream, have been extracted and decoded progressively after at least the decoding of "G" coded pictures in the video stream that prior to the particular Tier-K coded picture.

The tier system extends support to different approaches of PVR implementations:

1. Bottom-up approach—based on tracking and identifying pictures from the least-important tier (i.e., discardable pictures) and then pictures in one or more of the respective successive tiers of more important pictures.
2. Top-down approach—based on tracking and identifying pictures from the most-important tier (i.e., I or IDR pictures) and then pictures in one or more of the respective successive tiers of less important pictures.
3. Hybrid approach—based on a combination of the bottom-up approach and top-down approach.

One or more "picture interdependencies" rules distinctively define or specify the pictures in a respective tier (or levels in each tier, in some embodiments) in the plurality of "T" tiers. In general, a picture interdependency rule (PIR) expresses: (1) "picture interdependencies" of and/or (2) characteristics or properties of the coded picture in the video stream. Coded pictures in each respective tier adhere to the corresponding set of one or more PIRs corresponding to the tier. A PIR may be characterized by considering the coded picture in relation to any combination of the following:

1. The relation of the coded picture's size to the immediately prior coded picture(s) in the video stream.
2. The relation of the coded picture's size to the immediately prior coded picture(s) in the video stream that belong to a particular tier.
3. The relation of the coded picture's size to the immediately prior coded picture(s) in the video stream that respectively belong to a particular set of tiers.
4. The relation of the coded picture's size to immediately subsequent coded picture(s) in the video stream.
5. The relation of the coded picture's size to the immediately subsequent coded picture(s) in the video stream that belong to a particular tier.
6. The relation of the coded picture's size to the immediately subsequent coded picture(s) in the video stream that respectively belong to a particular tier or to a particular set of tiers.
7. The location or separation of the picture in relation to the immediately prior picture in the video stream that belong to a particular tier.
8. The location or separation of the picture in relation to the immediately prior or subsequent pictures in the video stream that belong to a particular set of tiers.
9. A characteristic of the coded picture (e.g., number of bits of the coded picture).
10. A start condition for commencing the tracking of pictures in a tier.
11. An end condition that ceases the tracking of pictures in a tier.

The set of PIRs for Tier-K may include the set of PIRs corresponding to a tier among Tier-1 through Tier K−1. In one embodiment, the set of PIRs for Tier-K includes all the set of PIRs corresponding to Tiers 1 through K−1.

Certain embodiments disclosed herein also provide a framework that conveys information pertaining to the interdependencies of pictures in the AVC stream. This framework is preferably generic to accommodate various types of assistive information. For instance, in the context of PVR implementations, a framework for conveyance of PVR assistive information consists of the following attributes:

1. Signaling—the location and layer for signaling must not be limited to a particular type of PVR assistive information.
2. PVR assistive information—various types of assistive information must be supported in a compact manner to limit impact on bit-rate.
3. Association of signaled information to pictures in the AVC stream must be supported implicitly and explicitly.
4. Support a hierarchy system of "T" tiers.

In one embodiment, auxiliary information is provided to convey that the coded pictures in the video stream adhere to the set of PIRs corresponding to one or more tiers. In one embodiment, the auxiliary information specifies that the coded pictures in the video stream adhere to the higher or first K tiers of the T tiers. For instance, PVR assistive information is provided to convey that the coded pictures in the video stream adhere to the set of PIRs corresponding to one or more tiers. However, PVR assistive information may assert the PIRs for a subset of the tiers. For instance, the PVR assistive information may specify and assert that pictures in the AVC stream adhere to the first K tiers of T tiers.

In one embodiment, one or more data field could be used to identify one of several possible coding schemes employing a unique "set of tiers (or levels in some embodiments), each tier (or level) being characterized by a respective set of PIRs. Each coding scheme, S, has a maximum number of tiers, $T_s$. A second data field asserts to a decoder the validity of PIRs associated with the first N tiers defined for coding scheme S. Hence, the PVR assistive information asserts to the decoder that the PIRs for the first N tiers are valid and the decoder can use the PIRs of an asserted tier to track the pictures associated with that asserted tier.

Each coding scheme defines its Tiers (or levels of each Tier in some embodiments), each Tier characterized, in one embodiment, by.
1. A starting tracking point for pictures in a tier. E.g., Tier-1's starting pictures is a RAP.
2. An ending condition for tracking the pictures in a tier.
3. A set of one or PIRs In an alternate embodiment, the identification data field does not exist and there is one and only one scheme so there is no need to signal or communicate an identification for the scheme. For instance, PVR assistive information may identify a known or registered picture-tiered scheme. In one scheme, Tier-1 may be defined as the set of pictures that have ascending PTS (or picture output times) from a defined point in a video stream and the PVR assistive information is provided to assert that the decoder can rely on that assumption. In such case, a decoder can identify Tier-1 pictures by tracking progressively pictures with ascending PTS starting after a RAP and a Tier-1 picture can be guaranteed to be fully reconstructable after a second RAP. Tier-2 may be defined as the set of pictures that comply with one or more PIRs.

Having described the various mechanisms of the disclosed embodiments, a preliminary example will help to illustrate the various aforementioned features. Each picture in a bitstream belongs to one of a hierarchy of T tiers. A decoder starts tracking pictures progressively at a RAP to identify Tier-1 pictures, Tier-2 pictures, up to the N-th tier asserted by the received PVR assistive information. A decoder may opt to only identify pictures for the first M tiers, where M<N. As explained above, each of the $T_s$ tiers in a coding scheme S is characterized by: a starting tracking condition, a set of rules that identifies a picture as belonging to the respective tier, and an end tracking condition. Tracking condition for Tier-K pictures assumes active tracking of tiers 1 through K−1. Tracking of Tier-1 pictures starts at a RAP. The decoder must be able to identify:
Tier-1 pictures independently of Tiers 2 through T
Tier-2 pictures independently of Tiers 3 through T
Tier-K pictures independently of Tiers K+1 through T The decoder tracks and identifies pictures progressively. PVR assistive information signals that the rules for the first N tiers can be assumed valid and allows for decoder to identify and extract pictures in Tiers 1 through N.

In one embodiment, a starting criteria (e.g., tracking starting condition) for a particular tier can be based on one or more properties of a compressed picture in the stream and/or the relationship of a property of the compressed picture to the same property of one or more other compressed pictures in the AVC stream. For example, one picture property can be the size (e.g., number of bits) of the compressed picture relative to another compressed picture's size. Such a relative property to another compressed picture may depend on one or more compressed pictures having yet another property, such as, having a particular relative location in the AVC bitstream, such as the picture immediately prior in the AVC stream. In addition, the starting criteria for a particular tier may judge a property relative to the same property of another picture in the AVC stream that has been tracked and identified as belonging to another tier. For example, the starting tracking for a Tier-K may rely in the relative location from the last tracked and identified one or more pictures in Tier-K−1. The relative location to the last tracked and identified one or more pictures in Tier-K−1 may require sufficient separation in number of pictures (e.g., exceeds a minimum number of pictures of separation in the stream). Alternatively, the starting tracking for a Tier-K may judge the difference in PTS from a candidate start point to the last tracked and identified picture in Tier-K, such as requiring a difference in PTS above a threshold, on in an alternate embodiment, below the threshold. In another embodiment, the starting tracking for a Tier-K may rely in the difference in PTS from a candidate start point to the last tracked and identified one or two pictures in Tier-K−1.

In one embodiment, a starting tracking criteria for a tier can be the size (e.g., number of bits) of the compressed picture in relation to the size of another picture (i.e., relatively speaking), or the absolute size (e.g., number of bits) of the compressed picture, or the size in relation to the bit rate of the AVC stream. In other words, the starting tracking criteria can involve absolute size, relative size to other compressed picture(s) (e.g., immediately prior pictures in a stream), and/or the size in relation to the bit rate of the AVC stream. The relative size of one compressed picture to another can be relative to the size of the prior picture and considering which tier the picture belongs or in relation to prior tracked pictures, or the prior tracked pictures in the same tier.

In one embodiment, a stopping criteria (e.g., ending condition) for a tier can be based on one or more properties of a compressed picture in the stream and/or the relationship of a property of the compressed picture to one or more other pictures in the stream. For example, one picture property can be the size (e.g., number of bits) of the compressed picture to another picture. In one embodiment, a stopping tracking criteria for a tier can be the size (e.g., number of bits) of the compressed picture in relation to the size of another picture (i.e., relatively speaking), or the absolute size (e.g., number of bits) of the compressed picture, or the size in relation to the bit rate of the AVC stream. In other words, the stopping tracking criteria can involve absolute size, relative size to other compressed picture(s) (e.g., immediately prior pictures in a stream), and/or the size in relation to the bit rate of the AVC stream. The relative size of one compressed picture to another can be relative to the size of the prior picture and considering which tier the picture belongs or in relation to prior tracked pictures, or the prior tracked pictures in the same tier.

Note that reference herein to pictures in a stream will be understood to refer to compressed pictures, such as in an AVC stream.

A description of the MPEG-2 Video Coding standard can be found in the following publication, which is hereby incorporated by reference: (1) ISO/IEC 13818-2, (2000), "Information Technology—Generic coding of moving pictures and associated audio—Video." A description of the AVC video coding standard can be found in the following publication, which is hereby entirely incorporated by reference: (2) ITU-T Rec. H.264 (2005), "Advanced video coding for generic audiovisual services." A description of MPEG-2 Systems for transporting AVC video streams in MPEG-2 Transport packets can be found in the following publications, which are hereby entirely incorporated by reference: (3) ISO/IEC 13818-1, (2000), "Information Technology—Generic coding of moving pictures and associated audio—Part 1: Systems," and (4) ITU-T Rec. H.222.0|ISO/IEC 13818-1:2000/AMD.3, (2004), "Transport of AVC video data over ITU-T Rec. H222.0|ISO/IEC 13818-1 streams."

Throughout this specification, tiers should be understood to refer to picture interdependency tiers.

It is noted that "picture" is used throughout this specification to refer to an image portion or complete image from a sequence of pictures that constitutes video, or digital video, in one of a plurality of forms. Throughout this specification, video programs or other references to visual content should be understood to include television programs, movies, or any other signals that convey or define visual content such as, for example, those provided by a personal video camera. Such video programs, when transferred, may include compressed data streams corresponding to an ensemble of one or more sequence of pictures and other elements that include video, audio, and/or other data, multiplexed and packetized into a transport stream, such as, for example, MPEG-2 Transport.

A video stream may further refer to the compressed digital visual data corresponding to any video service or digital video application, including but not limited to, a video program, a video conferencing or video telephony session, any digital video application in which a video stream is transmitted or received through a communication channel in a network system, or any digital video application in which a video stream is stored in or retrieved from a storage device or memory device. The disclosed embodiments may be embodied in many different forms and should not be construed as limited to the embodiments set forth herein; rather, these embodiments are provided so that this disclosure will be thorough and complete, and will fully convey the scope of the disclosure to those having ordinary skill in the art. Although a digital home communication terminal (DHCT) is used as an example throughout the specification, particular embodiments described herein extend to other types of receivers with capabilities to receive and process AVC streams. For instance, particular embodiments are applicable to hand-held receivers and/or mobile receivers that are coupled to a network system via a communication channel. Certain embodiments described herein also extend to network devices (e.g., encoders, switches, etc.) having receive and/or transmit functionality, among other functionality. Particular embodiments are also applicable to any video-services-enabled receiver (VSER) and further applicable to electronic devices such as media players with capabilities to process AVC streams, independent of whether these electronic devices are coupled to a network system. Furthermore, all embodiments, illustrations and examples given herein are intended to be non-limiting, and are provided as an example list among other examples contemplated but not shown.

FIG. 1 is a block diagram that depicts an example subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, a display device 140 or a personal computer (not shown), among other devices. The DHCT 200 receives signals (video, audio and/or other data) including, for example, digital video signals in a compressed representation of a digitized video signal such as, for example, AVC streams modulated on a carrier signal, and/or analog information modulated on a carrier signal, among others, from the headend 110 through the network 130, and provides reverse information to the headend 110 through the network 130.

The network 130 may include any suitable medium for communicating television service data including, for example, a cable television network or a satellite television network, among others. The headend 110 may include one or more server devices (not shown) for providing video, audio, and other types of media or data to client devices such as, for example, the DHCT 200.

The headend 110 also includes one or more encoders or compression engines 111 that, in one embodiment, provides auxiliary information (e.g., PVR assistive information, scheme information) into the transport stream. Although shown residing in a headend 110, the encoders may be located elsewhere within the network. For instance, providing of auxiliary information may be implemented upstream from or external to the headend 110. The headend 110 and the DHCT 200 cooperate to provide a user with television services including, for example, video programs, an interactive program guide (IPG), and/or video-on-demand (VOD) presentations, among others. The television services are presented via the display device 140, which is typically a television set that, according to its type, is driven with an interlaced scan video signal or a progressive scan video signal. However, the display device 140 may also be any other device capable of displaying video images including, for example, a computer monitor. Although shown communicating with a display device 140, the DHCT 200 may communicate with other devices that receive, store, and/or process video streams from the DHCT 200, or that provide or transmit video streams or uncompressed video signals to the DHCT 200.

Figure 2:
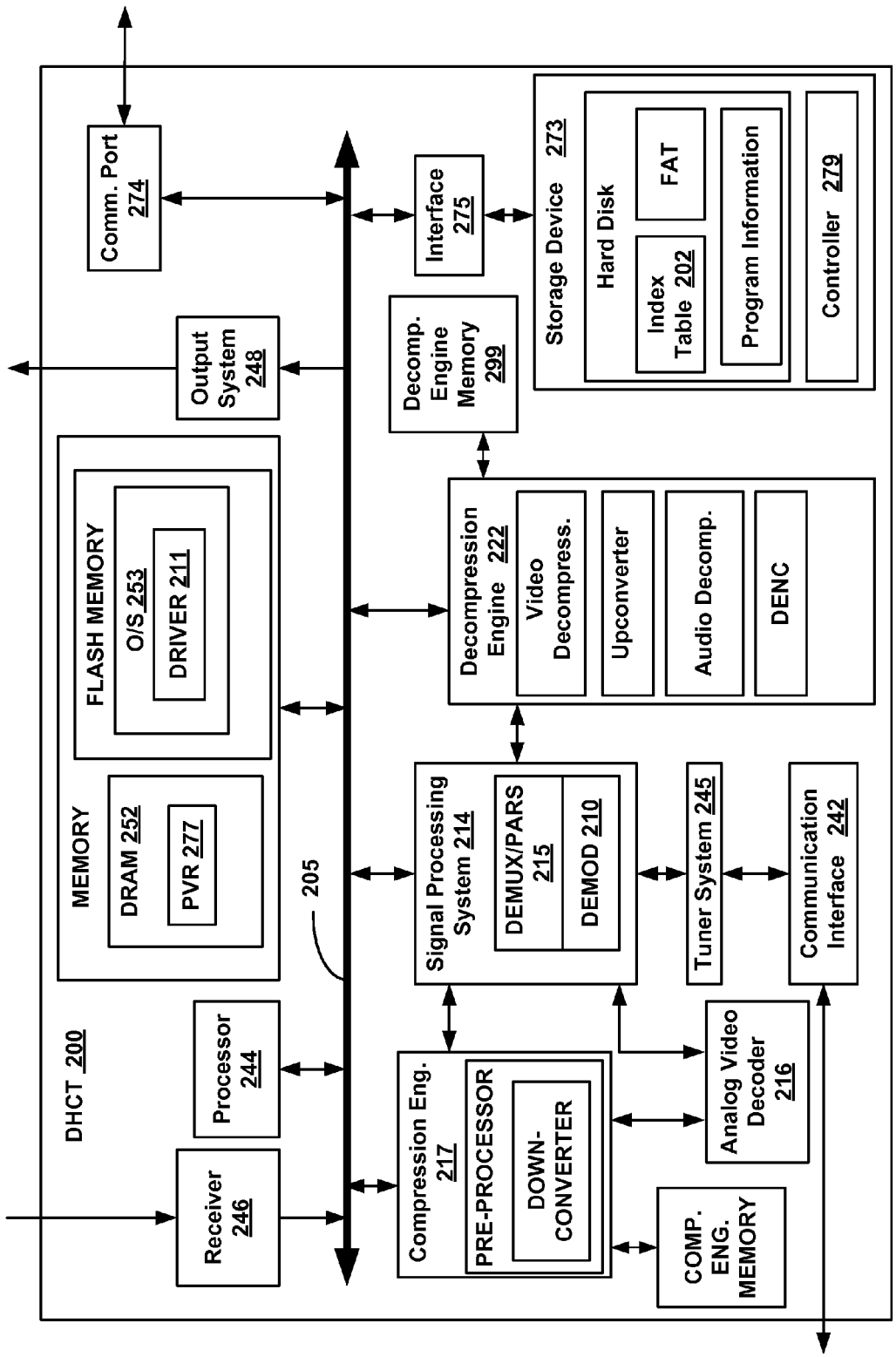
FIG. 2 is a block diagram of an embodiment of a digital home communication terminal (DHCT) as depicted in FIG. 1 and related equipment, in which an embodiment of systems and methods that implement at least in part processing of compressed video and inferential processing to ascertain plural levels of picture interdependencies is implemented.

FIG. 2 is a block diagram that illustrates an example of selected components of the DHCT 200. It will be understood that the DHCT 200 shown in FIG. 2 is merely illustrative and should not be construed as implying any limitations upon the scope of the disclosure. For example, in some embodiments, the DHCT 200 may have fewer, additional, and/or different components than the components illustrated in FIG. 2. Any of the described subsystems or methods of DHCT 200 and/or encoder 111 can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

The DHCT 200 is generally situated at a user's residence or place of business and may be a stand-alone unit or integrated into another device such as, for example, a television set or a personal computer. The DHCT 200 preferably includes a communications interface 242 for receiving signals (video, audio and/or other data) from the headend 110 (FIG. 1) through the network 130 (FIG. 1), and provides reverse information to the headend 110.

The DHCT 200 may further include one or more processors (one processor 244 is shown) for controlling operations of the DHCT 200, an output system 248 for driving the television display 140 (FIG. 1), and a tuner system 245 for tuning to a particular television channel and/or frequency and for sending and receiving various types of data to/from the headend 110 (FIG. 1). The DHCT 200 may include, in some embodiments, multiple tuners for receiving downloaded (or transmitted) data. The tuner system 245 can select from a plurality of transmission signals provided by the subscriber television system 100 (FIG. 1). The tuner system 245 enables the DHCT 200 to tune to downstream media and data transmissions, thereby allowing a user to receive digital media content via the subscriber television system 100. In one embodiment, analog TV signals can be received via tuner system 245. The tuner system 245 includes, in one implementation, an out-of-band tuner for bi-directional data communication and one or more tuners (in-band) for receiving television signals. Additionally, a receiver 246 receives externally-generated user inputs or commands from an input device such as, for example, a remote control device (not shown).

The DHCT 200 may include one or more wireless or wired interfaces, also called communication ports or interfaces 274, for receiving and/or transmitting data or video streams to other devices. For instance, the DHCT 200 may feature USB (Universal Serial Bus), Ethernet, IEEE-1394, serial, and/or parallel ports, etc. The DHCT 200 may be connected to a home network or local network via communication interface 274. The DHCT 200 may also include an analog video input port for receiving analog video signals. User input may be provided via an input device such as, for example, a hand-held remote control device or a keyboard.

The DHCT 200 includes at least one storage device 273 for storing video streams received by the DHCT 200. A PVR application 277, in cooperation with operating system 253 and device driver 211, effects among other functions, read and/or write operations to/from the storage device 273. The processor 244 may provide and/or assist in control and program execution for operating system 253, device driver 211, applications (e.g., PVR 277), and data input and output. The processor 244 may further track the received video stream and ascertain that pictures belong to one or more tiers (or levels of one or more tiers) based on inferential processing, or receive auxiliary information identifying schemes pertaining to one or more picture interdependency rules (PIRs) and then ascertain that pictures belong to one or more tiers (or levels of tiers) based on an indicated adherence to those PIRs, and assist at least in part decode operations or other processing operations based on the ascertaining of the picture interdependencies and/or characteristics. Herein, references to write and/or read operations to the storage device 273 can be understood to include operations to the medium or media of the storage device 273. The device driver 211 is generally a software module interfaced with and/or residing in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here.

The storage device 273 may be located internal to the DHCT 200 and coupled to a common bus 205 through a communication interface 275. The communication interface 275 can include an integrated drive electronics (IDE), small computer system interface (SCSI), IEEE-1394 or universal serial bus (USB), among others. Alternatively or additionally, the storage device 273 may be externally connected to the DHCT 200 via a communication port 274. The communication port 274 may be according to the specification, for example, of IEEE-1394, USB, SCSI, or IDE. In one implementation, video streams are received in the DHCT 200 via communications interface 242 and stored in a temporary memory cache (not shown). The temporary memory cache may be a designated section of DRAM 252 or an independent memory attached directly, or as part of a component in the DHCT 200. The temporary cache is implemented and managed to enable media content transfers to the storage device 273. In some implementations, the fast access time and high data transfer rate characteristics of the storage device 273 enable media content to be read from the temporary cache and written to the storage device 273 in a sufficiently fast manner. Multiple simultaneous data transfer operations may be implemented so that while data is being transferred from the temporary cache to the storage device 273, additional data may be received and stored in the temporary cache.

The DHCT 200 includes a signal processing system 214, which comprises a demodulating system 210 and a transport demultiplexing and parsing system 215 (herein demultiplexing system) for processing broadcast and/or on-demand media content and/or data. One or more of the components of the signal processing system 214 can be implemented with software, a combination of software and hardware, or in hardware. The demodulating system 210 comprises functionality for demodulating analog or digital transmission signals.

The components of the signal processing system 214 are generally capable of QAM demodulation, forward error correction, demultiplexing of MPEG-2 transport streams, and parsing of packets and streams. Stream parsing may include parsing of packetized elementary streams or elementary streams. Packet parsing may include parsing and processing of fields that deliver scheme information (from which one or more PIRs can be inferred) corresponding to compressed pictures of the AVC stream. In one embodiment, the parsing is performed by signal processing system 214 extracting the information and processor 244 providing the processing and interpretation of the information. In some embodiments, the processor 244 performs the parsing, processing, and interpretation. The signal processing system 214 further communicates with the processor 244 via interrupt and messaging capabilities of the DHCT 200. The processor 244 annotates the location of pictures within the video stream or transport stream as well as other pertinent information corresponding to the video stream. Alternatively or additionally, the annotations may be according to or derived from information in the video stream. The annotations by the processor 244 enable normal playback as well as other playback modes of the stored instance of the video program. Other playback modes, often referred to as "trick modes," may comprise backward or reverse playback, forward playback, or pause or still. The playback modes may comprise one or more playback speeds other than the normal playback speed. In some embodiments, pictures may be sorted out, on a per GOP or sub-GOP basis or otherwise, into tiers or levels of tiers such that all pictures of a given tier reference only tiers on that tier (e.g., Tier-1) or higher (e.g., if Tier-2 pictures are desired, reference Tier-1 and Tier-2 pictures). Then, for a given stream manipulation, such as fast forward, the knowledge of these different picture levels (e.g., as annotated in a storage device) can be used to drop pictures and still be assured that all picture references are satisfied.

In some embodiments, the auxiliary information (including scheme information) is provided to the decompression engine 222 by the processor 244. In another embodiment, the annotations stored in the storage device are provided to the decompression engine 222 by the processor 244 during playback of a trick mode. In yet another embodiment, the annotations are only provided during a trick mode, wherein the processor 244 has programmed the decompression engine 222 to perform trick modes.

The packetized compressed streams can also be outputted by the signal processing system 214 and presented as input to the decompression engine 222 for audio and/or video decompression. The signal processing system 214 may include other components (not shown), including memory, decryptors, samplers, digitizers (e.g., analog-to-digital converters), and multiplexers, among others. The demultiplexing system 215 parses (e.g., reads and interprets) transport packets, and deposits the information corresponding to the auxiliary information corresponding to the AVC stream into DRAM 252.

Upon effecting the demultiplexing and parsing of the transport stream, the processor 244 interprets the data output by the signal processing system 214 and generates ancillary data in the form of a table or data structure (index table 202) comprising the relative or absolute location of the beginning of certain pictures in the compressed video stream in accordance with the ascertained tiers. The processor 244 also processes the information corresponding to the auxiliary information (or in some embodiments as inferentially ascertained) to make annotations for PVR operations. The annotations are stored in the storage device by the processor 244. Such ancillary data is used to facilitate the retrieval of desired video data during future PVR operations.

The demultiplexing system 215 can parse the received transport stream (or the stream generated by the compression engine 217, which in an alternate embodiment may be a program stream, without disturbing its video stream content and deposit the parsed transport stream (or generated program stream) into the DRAM 252. The processor 244 can generate the annotations even if the video program is encrypted because the auxiliary information, in embodiments where present in the AVC stream, are carried unencrypted. The processor 244 causes the transport stream in DRAM 252 to be transferred to a storage device 273. Additional relevant security, authorization and/or encryption information may be stored. Alternatively or additionally, the auxiliary information corresponding to the AVC stream may in the form of a table or data structure comprising the interdependencies among the pictures, as explained further below.

Note that in one embodiment, reference herein to a decoding system comprises decoding functionality and cooperating elements, such as found in the collective functionality of the decompression engine 222, processor 244, signal processing system 214, and memory. In some embodiments, the decoding system can comprise fewer, greater, or different elements. Further, in one embodiment, systems and methods of the disclosed embodiments include components from the headend (e.g., the encoder 111, etc.) and/or components from the DHCT 200, although fewer or greater amount of components may be found in some embodiments.

An encoder or compression engine, as explained above, may reside at the headend 110 (e.g., embodied as encoder 111), in the DHCT 200 (e.g., embodied as compression engine 217), or elsewhere. The compression engine 217 can receive a digitized uncompressed video signal, such as, for example, one provided by analog video decoder 216, or a decompressed video signal produced by a decompression engine (e.g., decompression engine 222) as a result of decompressing a compressed video signal.

In one embodiment, digitized pictures and respective audio output by the analog video decoder 216 are presented at the input of the compression engine 217, which compresses the uncompressed sequence of digitized pictures according to the syntax and semantics of a video compression specification. Thus, the compression engine 217 implements a video compression method or algorithm that corresponds to a respective video compression specification, such as the AVC standard.

The systems and methods disclosed herein are applicable to any video compression method performed according to a video compression specification allowing for at least one type of compressed picture that can depend on the corresponding decompressed version of each of more than one reference picture for its decompression and reconstruction. For example, the compression engine 217 may compress the input video according to the specification of the AVC standard and produce an AVC stream containing different types of compressed pictures, some that may have a first compressed portion that depends on a first reference picture for their decompression and reconstruction, and a second compressed portion of the same picture that depends on a second and different reference picture.

In an alternate embodiment, a compression engine with similar compression capabilities, such as one that can produce AVC streams, is connected to the DHCT 200 via communication port 274, for example, as part of a home network. In another embodiment, a compression engine with similar compression capabilities, such as one that can produce AVC streams, may be located at the headend 110 or elsewhere in the network 130.

Unless otherwise specified, a compression engine as used herein may reside at the headend 110 (e.g., as encoder 111), in the DHCT 200 (e.g., as compression engine 217), connected to DHCT 200 via communication port 274, or elsewhere. Likewise, video processing devices as used herein may reside at the headend 110, in the DHCT 200, connected to the DHCT 200 via communication port 274, or elsewhere. In one embodiment, the compression engine and video processing device reside at the same location. In another embodiment, they reside at different locations. In yet another embodiment, the compression engine and video processing device are the same device.

The compressed video and audio streams are produced in accordance with the syntax and semantics of a designated audio and video coding method, such as, for example, MPEG-2 or AVC, so that the compressed video and audio streams can be interpreted by the decompression engine 222 for decompression and reconstruction at a future time. Each AVC stream is packetized into transport packets according to the syntax and semantics of transport specification, such as, for example, MPEG-2 transport defined in MPEG-2 systems. Each transport packet contains a header with a unique packet identification code, or PID, associated with the respective AVC stream.

The demultiplexing system 215 may include MPEG-2 transport demultiplexing capabilities. When tuned to carrier frequencies carrying a digital transmission signal, the demultiplexing system 215 enables the separation of packets of data, corresponding to the desired AVC stream, for further processing. Concurrently, the demultiplexing system 215 precludes further processing of packets in the multiplexed transport stream that are irrelevant or not desired, such as packets of data corresponding to other video streams. Parsing capabilities of the demultiplexing system 215 allow for the ingesting by the DHCT 200 of program associated information carried in the transport packets. Parsing capabilities of the demultiplexing system 215 may allow for ingesting by the DHCT 200 of, for example, information corresponding to the characteristics of the interdependencies among the pictures of the AVC stream. The auxiliary information can be provided by specifying explicit information in the private data section of the adaptation field or other fields of a transport stream packet, such as that of MPEG-2 transport. By specification of this information, it should be understood to practitioners in the field that the signaling of such information can correspond to the video program's multiplex at the transport layer (rather than in the video layer). The auxiliary information can be carried as unencrypted data in the video program (e.g., the multiplex of the streams associated with the video program) via, for example, navigation to private data in the adaptation field of MPEG-2 Transport.

For instance, a transport packet structure according to MPEG-2 comprises 188 bytes, and includes a 4-byte header with a unique packet identifier, or PID, that identifies the transport packet's corresponding stream. An optional adaptation field may follow the transport packet's header. The payload containing a portion of the corresponding stream follows the adaptation field, if present in transport packet. If the adaptation field is not present, the payload follows the transport header. The auxiliary information corresponding to the compressed pictures in the AVC stream is provided, in one embodiment, in the adaptation field and thus not considered as part of the video layer since the adaptation field is not part of transport packet's payload nor part of the AVC specification but rather part of the syntax and semantics of MPEG-2 Transport in accordance with the MPEG-2 systems standard.

The header of a transport stream may include a sync byte that sets the start of a transport stream packet and allows transmission synchronization. The header of the transport stream may further include a payload unit start indicator that, when set to a certain value (e.g., 1b in MPEG-2 Transport) in the packets carrying the video stream, indicates that the transport packet's payload begins with a first byte of a packetized elementary stream (PES). Video streams carried in a PES may be constrained to carrying one compressed picture per PES packet, and to a requirement that a PES packet must always commence as the first byte of a transport streams' packet payload. Thus, the payload unit start indicator provisions the identification of the start of each successive picture of the video stream carried in the transport stream. Note that the transport packets carrying the video stream are identified by the parsing capabilities of DHCT 200 (as described above) from program associated information or program specific information (PSI). For instance, in MPEG-2 Transport, program map tables identify the packet identifier (PID) of the video stream in the program map table (PMT), which in turn is identified via the program association table (PAT).

It should be noted that the auxiliary information is provided in the transport layer unencrypted, and enables a video decoder or other video processing device located in the network to determine for a particular application or operation or condition which pictures to extract from the video stream and/or which pictures to discard from the video stream without having to parse the compressed video layer or video stream. One or more flags in the transport packet header or in the adaptation field may identify starting points or random access points that may serve as stating points for tracking as explained further below. For instance, the adaptation field in MPEG-2 transport packets includes the random access indicator and the elementary stream priority indicator.

Digressing briefly to provide a contextual background on the complexities of picture interdependencies in AVC, AVC streams or other compressed video streams may comprise pictures encoded according to a hierarchy of picture interdependencies, or tiers of picture dependencies. Pictures are associated with a hierarchy of tiers based on picture interdependencies. Each compressed picture belongs to at most one tier. Tiers are numbered sequentially from top to bottom, starting with tier number 1 as the top tier. The bottom tier has the highest number. Pictures in a tier do not depend on pictures of any higher numbered tier. Another aspect of the hierarchy of tiers is that decoding of some pictures depends on particular other pictures. Therefore, if one picture serves as a reference picture to other pictures, it can be considered more important than other pictures. In fact, a particular set of pictures can be viewed in a hierarchy of importance, based on picture interdependencies.

An anchor picture (470) can be an I-picture, IDR-picture, or a FPP (forward predicted picture) that depends only on a past reference picture. In an alternate embodiment, an FPP is an anchor picture if it only depends on the most-recently decoded anchor picture.

Pictures can be characterized or ascertained (or classified) as belonging to a particular picture interdependency tier or "level." A picture's corresponding tier may be understood as a measure of its importance in decoding other pictures—some reference pictures are more important than other reference pictures because their decoded and reconstructed information propagates through more than one level of referencing.

A person of ordinary skill in the art should also recognize that although AVC picture types are used in this disclosure, the systems and methods disclosed herein are applicable to any digital video stream that compresses one picture with reference to another picture or pictures.

An AVC stream is used as an example throughout this specification. However, particular embodiments are also applicable to any compressed video stream compressed according to a video compression specification allowing for: (1) any picture to be compressed by referencing more than one other picture, and/or (2) any compressed picture that does not deterministically convey or imply its actual picture-interdependency characteristics from its corresponding picture-type information in the video stream. Herein, reference is made to the "picture-type" corresponding to an AVC compressed picture as the information conveyed by one or possibly more respective fields in the AVC stream with semantics conveying a "type of picture" or a type of "slice." That is, in accordance with the AVC standard, the picture-type may be conveyed in an AVC stream by different methods. For instance, the picture-type may be expressed by the "primary_pic_type" field in the "access unit delimiter." Alternatively, the picture-type may be expressed collectively by one or more "slice_type" fields corresponding respectively to each of one or more respective slices of the AVC compressed picture. The "slice_header" of each slice of an AVC compressed picture includes its "slice_type" field. An AVC compressed picture may have only one slice. Although picture type information is described as being transferred in specific fields or parts of standard formats, other placements or methods to convey such information are possible. The auxiliary information can be included in the network adaptation layer (the network adaptation layer as described in the AVC specification) or in any other layer, structure, stream, unit, position or location.

There are two main methods of compressing pictures in AVC, Intra and Inter (or Non-Intra) compression. Intra compression is done without reference to other pictures but typically exhibits less compression efficiency than Inter compression. Inter compression exploits temporal redundancy and irrelevancy by referencing one or more other pictures. A reference picture is depended on by at least one other picture for its compression. The decompressed version of the reference picture is used during AVC compression performed by a compression engine to predict at least one portion of a picture that depends on the reference picture. During decompression of an AVC stream performed by a decompression engine, such as decompression engine 222 in DHCT 200, a reference picture is also depended on to decompress and reconstruct at least a portion of at least one other picture. A picture that is not a reference picture (e.g., that is not depended on by at least one other picture) is a non-reference picture.

It should be understood that throughout this specification, the term "depend" or "dependence" in context to reference pictures means a "direct" dependence. These terms do not refer to an indirect dependence, such as the propagation of second picture's data through referencing a first picture that in turn referenced the second picture.

The output time of a picture, or picture-output time, refers to its display time, which is at the time of, or after, it has been completely decompressed and reconstructed. For instance, the output time of a picture corresponds to the time that output system 248 in DHCT 200 provides the decompressed version of an AVC picture to display device 140. To output a picture generally refers to an output of its intended decompressed version. It is noted that a picture that is decompressed and output prior to decompressing all of its depended reference pictures likely results in incomplete visual information, and thus, such output picture does not represent its intended decompressed version. A decode-time-stamp (DTS) and a presentation-time-stamp (PTS) is typically associated with a picture in an AVC stream in accordance with the specification for transporting AVC streams in the amended MPEG-2 systems standard. The PTS of a picture, whether provided in the transport stream or derived by decompression engine 222 in DHCT 200, corresponds to its hypothetical output time during fulfillment of a normal playback mode of the AVC stream. The DTS of a picture corresponds to its decompression time and can also be provided in the transport stream or derived by decompression engine 222 in DHCT 200. Successive compressed pictures in an AVC stream are decompressed in their transmission order (i.e., also the received order) by decompression engine 222 in DHCT 200, and thus have successive decompression times. Although certain embodiments of the disclosure presented herein primarily take into account and realize advantages in decoding based on a characterization or ascertaining of pictures to certain tiers, embodiments can also focus on analysis and optimization of presentation order. In general, the systems and methods described herein can be used by any software process, hardware device (or combination thereof) at any point in a creation, encoding, distribution, processing/decoding and display chain in order to realize a benefit.

The transmission order of pictures is established in accordance with several ordering rules, each with a respective priority. The highest-priority ordering rule enforces each reference picture to be transmitted in the AVC stream prior to all the pictures that reference it. A second ordering rule with high priority enforces pictures that would otherwise have the same ordering priority, to be transmitted in order of their respective output time, from the earliest to the latest.

Video coding standards typically assume a hypothetical instantaneous decoder, meaning that a compressed picture can be instantaneously decompressed at its DTS. A picture's PTS may equal its DTS, thus the hypothetical instantaneous decoder assumes in such cases that the picture is decompressed and output instantaneously.

A picture-output interval is defined according to the picture rate, or frame rate, of the AVC stream. For instance, if the AVC stream corresponds to a video signal at 60 pictures-per-second, the picture-output interval is approximately equal to 16.66 milliseconds. Each consecutive picture-output interval begins at a picture-output time, and a picture is output throughout the picture-output interval. In one embodiment, the actual output time of each picture output by decompression engine 222 is delayed from its hypothetical output time, or PTS, by one picture-output interval. That is, the actual output time of every picture equals the PTS of the picture plus one picture-output interval. A past reference picture is a previously-decompressed reference picture that has an output time prior to the picture referencing it. Likewise, a future reference picture is a previously-decompressed reference picture that has an output time after the picture referencing it.

An AVC Intra picture, or I-picture, does not reference other pictures but is typically referenced by other pictures. Unlike MPEG-2 Video, Intra compression in AVC allows for prediction of the region of the picture being compressed from the decompressed version of other portions of the same picture. An AVC "instantaneous decoding refresh" picture, or IDR-picture, is an I-picture that forces all previously decompressed pictures that are being used as reference pictures to no longer be used as reference pictures upon decompression of the IDR picture. P-pictures and B-pictures in AVC are allowed to contain intra-compressed portions. As in MPEG-2 Video, P-pictures and B-pictures in AVC allow for any, and possibly all, of a picture's portions to be inter-predicted from "previously-decompressed" reference pictures. Also similar to MPEG-2 Video, inter-prediction of any portion of a P-picture in AVC is limited to using at most one reference picture at a time. However, in contrast to MPEG-2 Video, each different inter-predicted portion of an AVC P-picture is allowed to be predicted from any one of several distinct reference pictures. Similar to MPEG-2 Video, inter-prediction of any portion of a B-picture in AVC is limited to using at most two reference pictures. But whereas MPEG-2 Video uses at most two reference pictures for all of the B-picture, any of several distinct reference pictures is allowed to be used on each different inter-predicted portion of an AVC B-picture.

The number of total reference pictures depended on by different AVC P-pictures may be respectively different. Similarly, the number of total reference pictures depended on by different AVC B-pictures may be respectively different. In accordance with the AVC standard, the "maximum number" of allowed reference pictures in an AVC stream varies depending on the specified "Level" for an AVC stream and the spatial resolution of the compressed pictures in that AVC stream. Furthermore, AVC reference pictures have no pre-determined location in relation to the picture referencing them. These flexibilities in the AVC standard result in better compression efficiency. However, they hinder stream manipulation capabilities of video processing devices since no inferences were heretofor implied about the picture-inter-dependency characteristics of a compressed picture in an AVC stream that has a picture-type of a P-picture or a B-picture.

Thus, the AVC standard specifies a P-picture by allowing each different inter-predicted portion of the picture to be predicted from "at most one" of any of a plurality of different reference pictures, as for example, 16 reference pictures. Unlike the MPEG-2 video standard or other video compression specifications that further limit inter-prediction to referencing one "predetermined" past reference picture, in AVC there is no such limitation. For instance, a first portion of an AVC P-picture can depend on one reference picture and another portion on a different reference picture. In fact, a picture referenced by a first portion of an AVC P-picture may be a past reference picture, and a second portion may depend on a future reference picture. As another example of the elaborate and complex picture-interdependencies allowed in AVC, a first AVC P-picture may depend on four future reference pictures, a second AVC P-picture may depend on three past reference pictures, and a third AVC P-picture may depend on both, a plurality of past reference pictures and a plurality of future reference pictures.

The AVC standard also specifies the B-picture differently than does the MPEG-2 video standard. MPEG-2 video specifies a B picture as a bi-directional picture, allowing for any portion of the picture to be compressed with a dependence of not more than two reference pictures, one a "predetermined" future reference picture, and the other a "predetermined" past reference picture. The same two reference pictures, or either of them, must be used as the reference pictures for predicting any portion of the B-picture. On the other hand, an AVC B-picture can depend on a plurality of reference pictures, for instance, up to 16 reference pictures, as long as any region of the B-picture is predicted by at most two regions in the plurality of reference pictures. When a region of the B-picture is predicted by two regions, it is said to be bi-predicted rather than bi-directionally predicted. In further contrast to MPEG-2 Video, an AVC B-picture is allowed to be used as a reference picture by other P-pictures or B-pictures.

As an example of the elaborate and complex picture-interdependencies allowed in AVC B-pictures, a first region of an AVC B-picture is allowed to be bi-predicted from two past reference pictures, a second region bi-predicted from two future reference pictures, a third region bi-predicted from a past reference picture and a future reference picture, and these three regions depend on six different reference pictures. The set of reference pictures used by a first B-picture in the AVC stream may be different than the set of reference pictures used by a second B-picture, even if they are both in consecutive transmission order or have consecutive output times. As described previously, AVC reference pictures have no predetermined location in relation to the picture referencing them. It should be apparent that many types and combinations of picture (or picture portion) dependencies are possible and that different types of auxiliary information can be created to describe the interdependencies or relationships among the pictures in order to provide benefits to later processing of the picture information.

Added complexities include the fact that an I-picture that does not serve as a reference picture is a non-reference picture. Furthermore, some I-pictures may be more important than other I-pictures, depending on the relative location of the I-picture in the AVC-stream and/or on how many other AVC compressed pictures reference the I-picture.

It should be appreciated that while some video compression specifications have picture-types that respectively imply specific picture inter-dependency characteristics, the picture-type of a compressed picture in an AVC stream cannot be relied on for implying an AVC compressed picture that exhibits some characteristics. Besides, even if the picture-type would be able to convey useful information, there are other aspects that make it difficult to easily peek and identify pictures with a certain characteristics in an AVC stream, such as, when the payload of transport packets carrying the AVC stream are encrypted or scrambled. Finding the slice_type and other desired data fields in a transport packet's payload to verify a certain characteristic of the picture may be difficult and require significant traversing into the AVC stream, especially if a desired data field's alignment relative to the start of a transport packet's payload or relative to some other identifiable delimiter varies.

Throughout this specification, a sequence of consecutive pictures in the AVC stream, or consecutive pictures in the AVC stream, refers to of the consecutive compressed pictures in their transmission order, or equivalently, a sequence of compressed pictures in the AVC stream having successive decode-time-stamps.

A discardable picture is a non-reference picture. A discardable picture with a delayed output time is a discardable picture having a PTS that is later than its DTS. That is, it is a discardable picture that is not output immediately after it is decompressed, and although it is not referenced by any other picture, it enters the "decoded picture buffer" (DPB) specified in the AVC standard for at least one picture-output interval. The DPB resides in decompression memory 299 of DHCT 200, although not limited to residing in that particular location.

Figure 3:
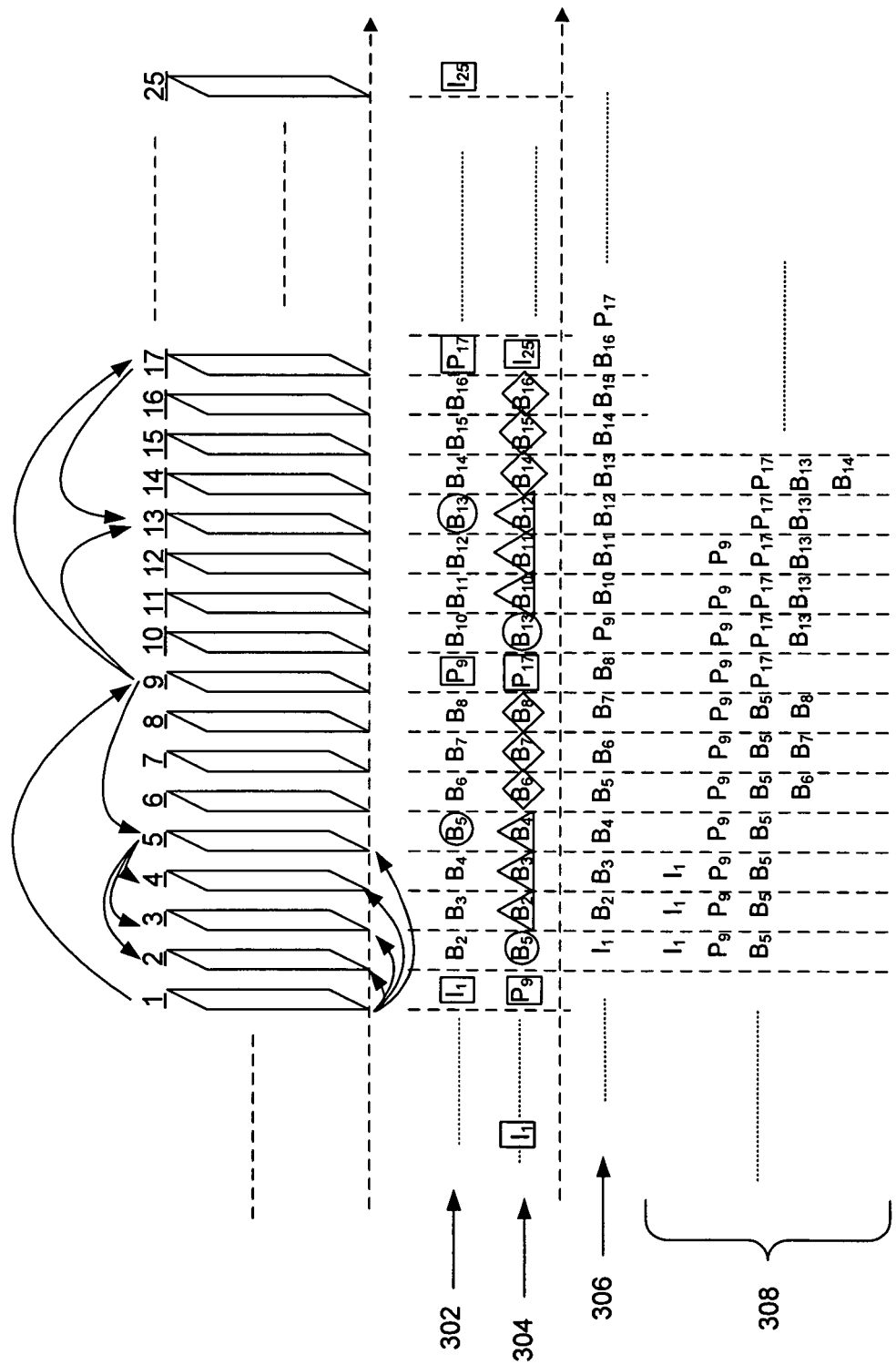
FIG. 3 is a block diagram that illustrates example picture interdependencies in an example sequence of compressed pictures provided in a video stream.

Attention is now directed to FIG. 3, which is a block diagram that illustrates picture interdependencies in an exemplary sequence of compressed pictures and their display order and transmission order, and serves as a basis for explaining the hierarchy of picture interdependency tiers. The first row 302 comprises the output order of an exemplary GOP, such as received and decoded in decode order (i.e., transmission order) at the decompression engine 222. The GOP comprises a sequence of compressed pictures (symbolically represented with geometric, 4-sided figures at the top of FIG. 3 and numbered 1-25, and also designated in rows 302, 304, and 306 in FIG. 3 by picture types, such as I, P, or B), including (from left to right in FIG. 3) an I picture ($I_1$), followed in output order by a B picture ($B_2$), which is followed by another B picture ($B_3$), and so on. The picture interdependencies are shown, in part, by the arrows above and below each picture symbol shown at the top of FIG. 3. An arrow tail shown at a picture depicts that such a picture serves as a reference picture to another picture(s) where the arrow head is shown. That is, an arrow conveys that the other picture is predicted from the reference picture. For instance, according to the arrow directions, $P_9$ depends from $I_1$ (or $I_1$ predicts $P_9$), $B_5$ depends from $I_1$ and $P_9$, $B_2$ depends from $I_1$ and $B_5$, $B_3$ depends from $B_5$ and $I_1$, $B_4$ depends from $I_1$ and $B_5$, and so on. These patterns are repeated in this example for each subsequent display order picture (e.g., interdependencies for $B_6$, $B_7$, and $B_8$ are bounded by $B_5$ and $P_9$ and have similar dependencies, such as $B_7$ and $B_6$ dependent on $B_5$ and $P_9$, $B_8$ dependent on $B_5$ and $P_9$, etc.) as is known. Although described having a similar pattern of dependency between bounds (e.g., between $I_1$ and $B_5$, $B_5$ and $P_9$, $P_9$ and $B_{13}$, $B_{13}$ and $P_{17}$), one having ordinary skill in the art should appreciate that different patterns can be found from one bounded group (between $I_1$ and $B_5$) to the next ($B_5$ and $P_9$). It is further noted that anchor pictures (e.g., pictures $I_1$, $P_9$, $P_{17}$, $I_{25}$) are shown encompassed with a box symbol in rows 302 (and 304).

Beneath row 302 of FIG. 3 is transmission order row 304, corresponding to the order in which the pictures are received at the decompression engine 222. The transmission order of pictures is different than the output or display order due to the need to have the reference pictures prior to decoding a picture. For instance, given the dependencies of $B_2$, $B_3$, etc. on $B_5$ as shown symbolically by the arrows in view of row 302, $B_5$ needs to be transmitted before $B_2$ and $B_3$ as reflected by the ordering of $B_5$ relative to (e.g., prior to) $B_2$ and $B_3$ in row 304. It is noted that $B_5$ and $B_{13}$ serve as reference pictures to other B pictures (e.g., $B_4$ depends from $B_5$), and hence are encompassed with a circle symbol (i.e., in rows 302 and 304, $B_5$ and $B_{13}$ are circled) to represent this feature. Similarly, given the dependency of $B_5$ on $P_9$ as set forth in row 302 and the arrows, $P_9$ needs to be transmitted before $B_5$, as reflected by the relative ordering in row 304. Note that P pictures can be forward predicted or backwards predicted, and typically, that fact is not evident until the pictures are decoded. For instance, knowledge of the picture type (e.g., as ascertained by a header) does not necessarily convey how prediction is employed or picture interdependencies.

Row 306 is referred to as the instantaneous output row (output of decompression engine 222), and section 308 represents the machine state of the decoded picture buffer (DPB). In MPEG-2, discardable pictures can be output immediately (no need to retain), though typically, for implementation reasons, such pictures are temporarily stored for at least a picture period or interval. In AVC streams, even with discardable pictures, there are circumstances where the output of the discardable, decoded picture is delayed and hence retained in the DPB. In FIG. 3, discardable, non-delayed pictures (e.g., $B_2$, $B_3$, $B_4$, etc.) are encompassed in row 304 by a triangle symbol, and discardable yet delayed pictures (e.g., $B_6$, $B_7$, $B_8$, etc.) are encompassed in row 304 with a diamond symbol. Referring to FIG. 3, $I_1$ is assumed to be output at some previous time. The DPB needs the reference pictures for the next picture time interval, and hence the variation in pictures in the DPB over time. For instance, $P_9$, being transmitted before $B_2$, $B_3$, etc. as set forth in row 304, is retained in the DPB, as is $I_1$. $B_5$, upon being received, is stored in the DPB, and $I_1$ is output. Subsequent to $I_1$, $B_2$ is instantaneously output, followed by an instantaneous output of $B_3$. To decode $B_4$, the DPB needs $I_1$ and $B_5$. $B_4$ is then output. For decoding $B_6$, $I_1$ is not needed. Note that $P_9$ and $B_5$ are at this point the only pictures retained in the DPB, and hence retain sufficient picture quality while maintaining temporal redundancy. In one embodiment, a picture is retained in the DPB if it has not been output or if it is required for referencing by another picture that has not been decompressed. Note that $B_6$ had to enter the DPB for the next decoding, but subsequently disappeared from the DPB since it was already displayed. Note that in this example, $B_2$, $B_3$, $B_4$, $B_{10}$, $B_{11}$, and $B_{12}$ are discardable (non-delayed), and $B_6$, $B_7$, $B_8$, $B_{14}$, $B_{15}$, and $B_{16}$ are discardable and delayed. Further, anchors include $I_1$, $P_9$, and $P_{17}$.

With continued reference to FIG. 3, attention is now directed to certain system and method embodiments that track compressed pictures of a video stream and ascertain the compressed pictures as belonging to an appropriate Tier (and/or level of a tier), with or without the benefit of auxiliary information (e.g., PVR assistive information or coding schemes), the characterization to a given tier or level occurring without the need to decode the compressed pictures of the video stream. Responsive to ascertaining that certain pictures belong to a given tier, decoding can be implemented for each tier independent of higher level tiers as explained above.

In one embodiment, pictures belonging to a first tier, Tier-1, consist of a first (or level 1) and second level (level 2) of pictures. In some embodiments, the first and second levels may be implemented as separate tiers. In one embodiment, a first level consists of I or IDR pictures. As set forth above, in some embodiments, auxiliary information (e.g., PVR assistive information) may be provided in the video stream that indicates that the compressed pictures adhere to one or more PIRs, as explained above. In some embodiments, one or more data fields in the received stream may indicate an encoding scheme employing one or more tiers, and a respective set of PIRs. A second data stream may indicate the validity of PIRs associated with the asserted tiers, and hence tracking may be employed based on those valid PIRs. In some embodiments, no auxiliary information or data fields are provided since only one scheme is employed and hence known in the network. Accordingly, the description below contemplates the above options.

As part of an inferential process, the DHCT 200 performs a first level of tracking of the received stream, ascertaining whether pictures belong to a first level of Tier-1. For instance, referring to FIG. 3, $I_1$ and $I_{25}$ represent a starting point or random access point in a video stream (e.g., using an RAP indicator, etc.). That is, tracking for Tier-1 pictures, in one embodiment, comprises tracking random access points (RAPs) as part of level 1 tracking (e.g., a starting tracking point for pictures in Tier-1). In some embodiments, level 1 tracking may commence from a previous GOP to guarantee fully reconstructable pictures. In one embodiment, the RAP refers to an access unit in the AVC bitstream at which a receiver commences the decoding of the video stream. The access unit also includes a sequence parameter set (SPS) and a picture parameter set (PPS) used for decoding the associated picture. The random access points can carry an I picture or an IDR picture. In one embodiment, the GOP, typically an MPEG-2 term, is equivalent to the picture sequences and dependencies found between two or more RAPs (e.g., I or IDR). Hence, a level 1 picture in a first tier, Tier-1, comprises an I or IDR picture, and in this example, includes $I_1$ in FIG. 3. Note that in some embodiments, when a RAP comprises an IDR, tracking may be reset. Further, level 2 tracking may not commence until a sufficient number of RAPs (e.g., 2-3 RAPs) have been ascertained.

In MPEG-2, PVR implementations using trick modes may go no further than the first level of the first Tier-1. For example, I-type pictures may be exclusively utilized in fast forward or rewind operations. If a finer level of granularity is desired, or improved accuracy in placement or removal of a picture in the trick mode operations, a second and/or third level or second tier allows for this improved functionality (e.g., granularity) while handling the complexities of AVC.

A second level of Tier-1 comprises tracking pictures with an ascending PTS. Another way of viewing this relative level of importance is that a picture (e.g., $B_5$ in FIG. 3) that has a PTS less than a prior picture in decode or transmission order (row 304, e.g., $P_9$) should not be asserted as a Tier-1 picture (e.g., where in one embodiment level 1 and level 2 are merged). Accordingly, ascending PTS tracking reveals (infers), for instance, $P_9$ and $P_{17}$ as belonging to Tier-1.

Note that a confirmation may be employed during tracking based on determining the adherence of the tracked pictures to one or more PIRs. For instance, and referring to FIG. 3, it is observed that $I_1$ is quantized less than $P_9$, which is quantized less than $B_5$, etc. In other words, a trend of diminishing video bits (compressed video bits) is observed, consistent with the one of the PIRs (e.g., compressed bit size) and which may be used as a confirmation that a particular level is being tracked.

As to ending conditions (e.g., to Tier-1 tracking), in one embodiment, tracking continues until a defined amount (e.g., two or more) of ascending PTS markers are detected (e.g., $P_9$, $P_{17}$), or in some embodiments, until a pattern can be discerned (e.g., a sub-GOP). For instance, the last two Tier-1 pictures (e.g., $I_1$ and $P_9$) may represent a bounding envelope for subsequent level tracking. That is, in one embodiment, the GOPs are demarcated by the RAPs, and sub-GOPS fall in between the GOPs as repetitive patterns. Note that in embodiments where auxiliary information or schemes are provided, such a pattern may be expressly specified via auxiliary information, as explained below. Note that in some embodiments, a second level picture may also be ascertained as belonging to (or characterized as) a first level picture, such as $I_{25}$ in FIG. 3.

One premise adhered to by certain embodiments of the disclosed systems and methods is that n+1 level tracking commences after being engaged in n-level tracking. Having engaged in tracking, a third level of tracking (or Tier-2 tracking) has a starting condition that there has been engagement of tracking at the second level and such second level tracking is successful. Likewise, tracking of ascending PTS should not commence until RAPs have been ascertained (i.e., level 1 tracking has been engaged and is successful in ascertaining that the received compressed pictures are RAPs).

Assuming a first tier (Tier-1) comprising the first and second levels, the compressed pictures immediately subsequent to the level 2 pictures (in transmission order, e.g., row 304), or immediately subsequent to the level 1 picture in some embodiments, represent candidates for third level (level 3) tracking. For instance, referring to FIG. 3, $B_5$ represents a candidate for a level 3 picture, since it follows (in transmission order) a second level picture ($P_9$). A level 3 candidate is subject to confirmation (before assertion as a level 3, or in one embodiment, Tier-2 picture) based on one or more PIRs (or also referred to herein as confirmation factors, listed below, in no particular order, as (i)(a)-(iv)).

With regard to one confirmation factor (e.g., (i)(a)), since a third level picture may comprise a picture immediately after a second level picture, the PTS of the candidate level 3 picture (e.g., $B_5$) is less than the PTS of the level 2 picture (e.g., $P_9$). If it is a greater PTS value, it is ascending to a level 1 picture (and hence not a proper level 3 picture candidate). Alternatively, confirmation factor (i)(a) confirms that the picture is not a level 2 picture, which makes the prior picture in transmission order very likely to serve as a future reference picture to subsequent pictures in the stream.

Another confirmation factor (confirmation factor (i)(b)) is to ascertain whether the picture is a reference picture. One mechanism involves determine or ascertaining by interrogation or detection of a stream indicator (e.g., NAL_ref_idc). Note that care should be exercised in using NAL_ref_idc, given the ambiguity of this parameter. For instance, a sequence parameter set (SPS) is also identified as a reference picture according to NAL_ref_idc. In other words, the existence of NAL_ref_idc provides an indication that the picture should not be discarded, but rather, investigated further to determine whether it is a reference picture. Preferably, the access unit delimiter (AUD) can be used to determine whether the picture is an I or IDR, which may be relevant if the RAP was missed. Similarly, the SEI message may be more dependable in this regard than the NAL_ref_idc.

Another mechanism (pertaining to (i)(b)) involves ascertaining from the PES layer from the candidate level 3 picture (e.g., $B_5$) whether its corresponding (PTS-DTS) is greater than two (i.e., CPL3 (PTS-DTS)>2, where CPL3 is the third level candidate picture). A value greater than two refers to a picture that is not one of the discardable pictures (e.g., $B_6$ or other pictures with diamond symbols) that just entered the DPB and is delayed, but instead, represents a reference picture. The benefit of confirmation factor (i)(b) is that there is no need to traverse beyond the PES layer.

Another confirmation factor (confirmation factor (ii)(a)) is whether ΔPTS (e.g., of $B_5$-$P_9$) is greater than a defined threshold (not consecutive pictures).

Another confirmation factor (confirmation factor (ii)(b)) is to track the ΔPTS for consistency. That is, the ascertaining of level 3 pictures may require determining several ΔPTSs. For instance, one embodiment tracks over a defined period of time or over a minimum number of RAPs. In one embodiment, the ΔPTS is fixed during tracking. In some embodiments, the ΔPTS is allowed to vary by a defined tolerance (e.g., ±n pictures, such as where n=1). As an example, ΔPTS ($B_5$-$P_9$), or more generally, ΔPTS (CPL3-PL2), where CPL3 refers to the candidate level 3 picture and PL2 refers to the second level picture. In one embodiment, ΔPTS for CPL3-PL2 (e.g., $B_5$-$P_9$) should be greater than a defined threshold (e.g., >1). For instance, if the difference is one ("1"), then the pictures are next to each other, which prevents a meaningful granularity. In other words, based on interrogation of annotations (explained below), the PTS preferably comprises a sufficient amount of spacing or "jump," otherwise the candidate picture is unwanted.

Another confirmation factor (confirmation factor (iii)) is to determine the size of the level 3 candidate compressed picture (e.g., number of bits) relative to the immediately preceding picture (which is the second level picture). For instance, in one embodiment, the candidate level 3 picture has to be smaller in size relative to the level 2 picture. For instance, referring to FIG. 3, the (size of $P_9$)-(size of $B_5$) is less than a defined threshold (e.g., has to be small). In some embodiments, this comparison can be performed using a ratio (e.g., (size of $B_5$/size of $P_9$)>% threshold).

Another confirmation factor (confirmation factor (iv)) can be illustrated by example, where the size of the level 3 candidate (e.g., $B_5$) is greater than all pictures after $B_5$ (in transmission order) and prior to the next level 2 picture.

Note that a stopping or ending condition (e.g., that the last two pictures of Tier-1 are enveloping pictures) is the change in PTS (i.e., ΔPTS), which equals ($PL_{1,K+1}$-$PL_{1,K}$), is greater than a defined threshold, where PL refers to picture level (e.g., first level, PL1), and K is an integer. Referring to FIG. 3, ΔPTS ($P_0$-$I_1$)>threshold (eight pictures in this case). In some embodiments, recursiveness is also a stop condition.

One having ordinary skill in the art should appreciate that the various confirmation factors (i)(a)-(iv) listed above may in one embodiment be listed in order of priority (e.g., from highest priority, (i)(a) to lowest (iv), and in some embodiments, be employed in different orders of priority.

Figure 4:
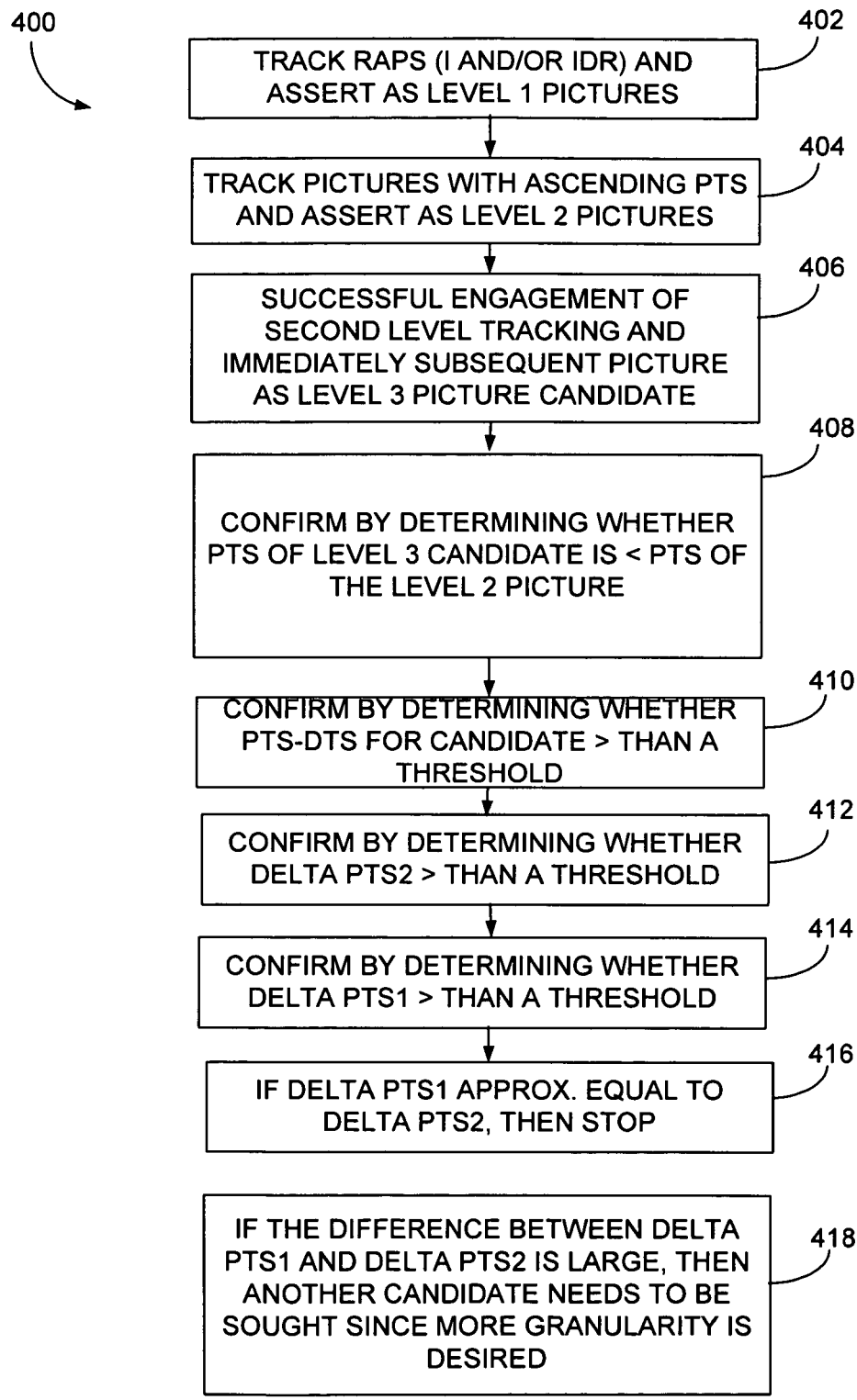
FIG. 4 is a flow diagram that illustrates a method embodiment for tracking and ascertaining picture levels.

One method embodiment for tracking and ascertaining whether pictures belong to a given level(s) and/or tier(s) is illustrated in FIG. 4 and denoted as method 400. It should be understood that the method 400 is merely exemplary, and some steps may be omitted in some embodiments, performed in different orders in some embodiments, and/or steps added in some embodiments as should be appreciated by one having ordinary skill in the art in the context of the disclosure. In one embodiment, the method 400 comprises a first level of tracking RAPs (I and/or IDR) and asserting (e.g., characterizing or classifying or ascertaining as belonging to a level or tier) as level 1 pictures (402). A second level comprises tracking pictures with an ascending PTS (404) and asserting as level 2 pictures. A third level comprises successfully completed engagement in second level tracking and immediately subsequent pictures (immediately subsequent to level 2 pictures in transmission order) as candidates for level 3 pictures (406). From this basis, confirmations/PIRs are made based on the last two pictures in tier 1 (e.g., level 1 and level 2, e.g., $I_1$ and $I_9$) as a sub-GOP or sub-pattern. One confirmation (e.g., (i)(a)) comprises determining whether the PTS of the candidate level 3 picture is less than the PTS of the level 2 picture (e.g., PTS of $B_5$<PTS of $P_9$) (408). For instance, with continued reference to FIG. 3, $I_1$ and $P_9$ comprise the last two Tier-1 pictures, and hence a determination is made as to whether PTS of $B_5$<PTS of $P_9$.

Continuing, another confirmation (e.g., (i)(b)) is whether (PTS-DTS) of the candidate level 3 picture (e.g., $B_5$) is greater than a threshold (e.g., two) (410). In other words, $B_5$ (a candidate picture that lies somewhere near the middle of the sub-pattern) is preferable to a candidate that is closer to either end of the sub-pattern (e.g., $B_2$).

Continuing, another confirmation (e.g., (ii)(a)) comprises determining whether ΔPTS2 (PTS of the level 2 and the PTS of the candidate level 3 picture (e.g., PTS of $P_9$-PTS of $B_5$) is greater than a defined threshold (e.g., has to be larger than one) (412), and whether ΔPTS1 (the PTS of the candidate minus the start of the boundary or, e.g., $B_5$-$I_1$) is greater than a threshold (414). If ΔPTS1 is about equal to ΔPTS2, then stop (416), since the candidate is near the middle of the pattern and hence level 3 tracking is exited. If the difference between ΔPTS1 and ΔPTS2 is large, then another candidate needs to be sought since more granularity is desired (418).

Note that there are generally three types of outcomes for the candidate picture, namely in the middle, to the left of the middle, and to the right of the middle (i.e., middle of the sub-pattern). Such a scenario provides for an additional determination. In other words, a time symmetry is determined between bounding frames or pictures. The right of the middle is typically unlikely since pictures have to be in transmission order, and consequently, all prior pictures in the envelope are likely discardable.

The picture in the middle of consecutive discardable pictures may be deemed of higher importance such as to allow a network processing device to selectively drop the less important pictures during network congestion or lack of bandwidth. Retaining the middle picture from the sequence of discardable pictures reduces the deviation from the original temporal sampling of the video signal and mitigates the presentation of a jerky video program to the end user. Likewise, reference pictures that are referenced only by discardable pictures may be deemed less important than reference pictures that are referenced by other reference pictures.

Figure 5:
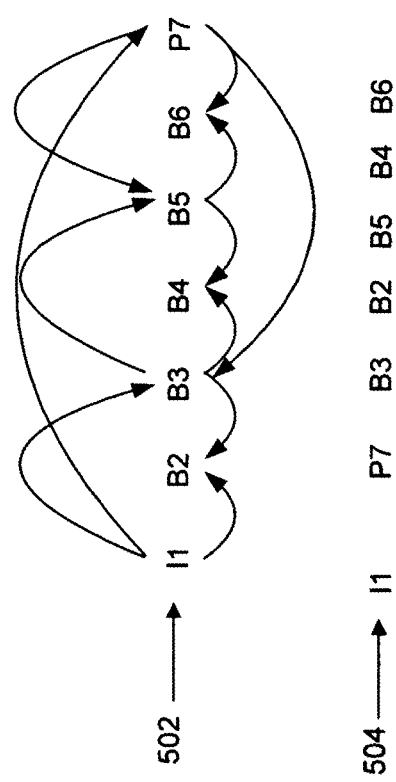
FIG. 5 is a block diagram that illustrates example picture interdependencies in an example sequence of compressed pictures provided in a video stream, and in particular, serves as an example for determining time symmetry during picture level candidate processing.

Referring to FIG. 5, shown is an example sub-pattern or envelope bounded by level 1 picture, $I_1$, and level 2 picture, $P_7$. FIG. 5 is used to show a methodology for candidates positioned to the left of the middle. In this example embodiment, level 1 and level 2 pertain to Tier-1 pictures. Row 502 corresponds to the output order or display order of the picture sequence comprising $I_1$, $B_2$, $B_3$, $B_5$, $B_6$, and $P_7$, the subscripts corresponding to the respective output order. Picture interdependencies are noted by the lines with arrowheads in similar manner as shown in FIG. 3. Row 504 corresponds to the transmission order of the pictures shown in row 502. In this example, the candidate level 3 picture is $B_3$. One methodology is to find the ascending PTS from $B_3$ to the right of the envelope picture, which is the last Tier-1 picture, $P_7$. Although ascending PTS, it is picture level three (PL3). The envelope now becomes bounded by $B_3$ and $P_7$ ($B_3$ now becomes the left, and $P_7$ is retained as the right picture), and from $B_3$, find the first ascending PTS picture, which is $B_5$ in this example. Then determine the proximity between ΔPTS1 and ΔPTS2, similar to the method described in association with FIG. 4 (e.g., whether ΔPTS for ($B_5$-$B_3$) is about equal to ΔPTS for ($P_7$-$B_5$)). If the difference is large, more granularity is required, otherwise, stop if the difference is about equal.

If the candidate is in the middle, then determine if ΔPTS1 is about equal to ΔPTS2 (similar to that described above in association with FIGS. 4 and 5), which is less than a defined threshold (i.e., small). If small, stop. Else, if large, divide into two envelopes (a left envelope and a right envelope), and repeat a similar process as described above for determining time symmetry between the two sets of boundaries.

Note that depending on the desired trick mode functionality (e.g., speed, direction, etc.), one embodiment may decode at only level one (e.g., 15× trick modes). In some embodiments, decoding may be implemented at level two and above. In some embodiments, decoding may occur at level three and above (e.g., requiring a granularity of every four pictures).

In some embodiments, the system and method embodiments described herein are advised of certain information that eliminates the inferential process described above, or in some embodiments, at least mitigates some of the guesswork. For instance, the auxiliary information (e.g., instructing on whether the P pictures are forward or backward predicted, whether a particular scheme (e.g., encoding scheme) is employed, from which PIRs can be inferred, etc.) can be provided in the adaptation field by the encoder 111, or by another device that interrogates the stream and subsequently performs an insertion. In some embodiments, the PVR application 277 can, through cooperation with the decompression engine 222, annotate the streams with such information (or without based on the inferential process described above). These annotations can be retrieved later when performing PVR functionality, and from these annotations, certain trick modes can be performed at varying levels of granularity or speeds.

In one embodiment, auxiliary information is provided to convey that the coded pictures in the video stream adhere to the set of PIRs corresponding to one or more tiers. In one embodiment, the auxiliary information specifies that the coded pictures in the video stream adhere to the higher or first K tiers of the T tiers. In one embodiment, one or more data field could be used to identify one of several possible coding schemes employing a unique "set of tiers, each tier being characterized by a respective set of PIRs. Each coding scheme, S, has a maximum number of tiers, $T_s$. A second data field asserts to a decoder the validity of PIRs associated with the first N tiers defined for coding scheme S. Hence, the PVR assistive information asserts to the decoder that the PIRs for the first N tiers are valid and the decoder can use the PIRs of an asserted tier to track the pictures associated with that asserted tier.

In one embodiment, the auxiliary information can be carried as private data in the adaptation field, the private data comprising a tag value, length (e.g., how much data to read), among other information, or different information in some embodiments.

One embodiment comprises conveying to the decoding system or other network device that the above-described tracking and ascertaining of picture levels is allowed, and in some embodiments, may provide for one or more rules to enable decoding. For instance, at one end of the information spectrum, the auxiliary information may convey that encoding was performed using scheme "X," or scheme "Y," or provide the decoding system with a GOP, hence providing the decoding system or network device with an explicit set of rules or mechanisms to avoid completely inferentially ascertaining the picture levels. At another end of the information spectrum, the auxiliary information may merely "allow" the decoding system to implement the inferential scheme described above to determine picture levels, or in some embodiments, may alternatively or additionally provide various picture decoding parameters.

Figure 6:
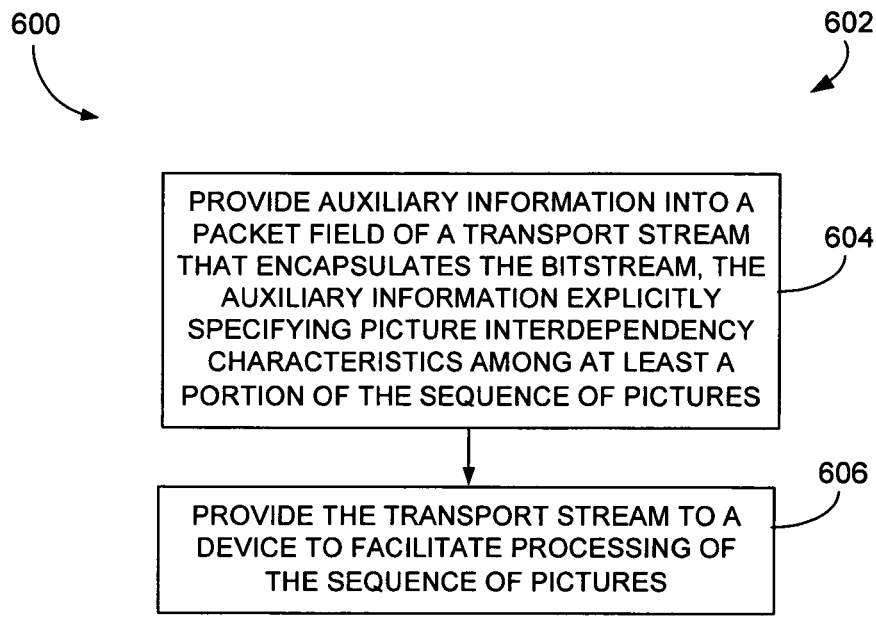
FIG. 6 is a flow diagram that illustrates a method embodiment for providing auxiliary information in a video stream.

FIG. 6 provides a flow diagram that illustrates one method embodiment, referred to as method 600, for conveying explicit auxiliary information. In particular, the method comprises providing auxiliary information into a packet field of a transport stream that encapsulates the bitstream, the auxiliary information explicitly specifying picture interdependency characteristics (e.g., schemes, adherence to PIRs, etc.) among at least a portion of the sequence of pictures (602), and providing the transport stream to a device (e.g., DHCT, video processing device, etc.) to facilitate processing (e.g., decoding, packet discarding, etc.) of the sequence of pictures (604).

Figure 7:
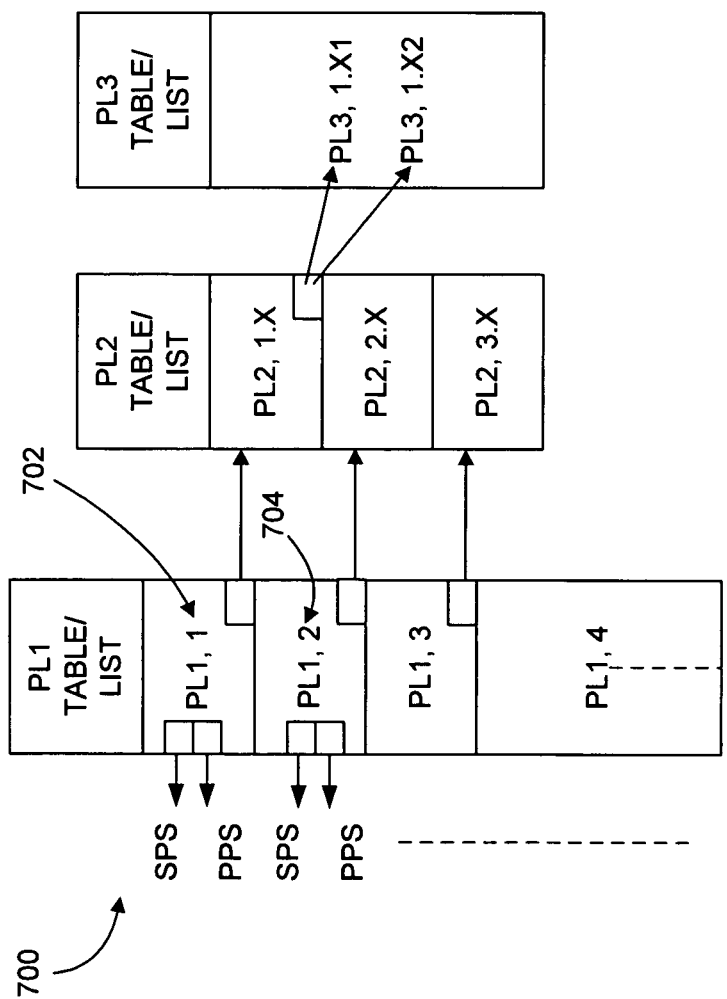
FIG. 7 is a block diagram that illustrates an embodiment of a data structure used to annotate auxiliary information.

FIG. 7 is a block diagram of an embodiment of a data structure 700 implemented by certain system embodiments (e.g., in the DHCT 200) to annotate the auxiliary information. As shown in FIG. 7, the data structure 700 comprises in one embodiment a multi-dimensional linked list, with at least one table or list for each picture level (e.g., one for the first picture level (e.g., level 1 picture), or PL1, one for the second picture level (PL2), and one for the third picture level (PL3). For instance, in the PL1 table or list, "PL1" refers to picture level one, "1" (702) refers to the first picture (RAPn), and "2" (704) refers to the subsequent picture (RAPn+1). Though shown as a multi-dimensional linked list, other data structures may be employed in some embodiments.

In some embodiments, for every picture "tagged" in levels 1, 2, or 3, the annotations enable the determination of an associated SPS and PPS in the storage device. Hence, certain embodiments of the data structure 700 include a reference to where the picture can be found as well as the associated SPS and PPS. In other words, each picture has associated with it a pointer to its annotated SPS and PPS. Note that there are no picture headers in AVC, hence making the tracking of the SPS and PPS valuable for PVR functionality. Thus, in some embodiments, in addition to annotating the level one RAPs (I and/or IDR), the SPS and PPS are also annotated. A process or device assisting the decoding operation (e.g., processor 244) extracts this information and informs the decompression engine 222 of the SPS and PPS.

FIG. 8 is a block diagram that illustrates an embodiment of a data structure 800 corresponding to the auxiliary information that conveys to the decoding system whether a given level is active or enabled or not. For instance, the data structure 800 comprises the following fields: scheme type 802, level 1 field 804, level 2 field 806, level 3 field 808, and level 4 field 810. One or more bits in each field may indicate whether the picture level is valid or not. For instance, a single bit may have a value of zero ("0") to signify to the decoding system that the picture level is not valid, and a single bit value of one ("1") to signify that the picture level is valid. In some embodiments, the scheme type may not be provided in the auxiliary information, or certain encoder manufacturers may only provide auxiliary information pertaining to fewer than the number of levels shown in FIG. 8. For instance, in some embodiments, the auxiliary information may omit (or maintain an invalid status) for the third level since the manufacturer may not wish to guarantee adherence to level 3, such as to allow greater flexibility.

Note that although the auxiliary information is described above as being conveyed as private data, other mechanisms for conveying the information may be employed (e.g., reserved field).

Further, reference is made herein to tiers and/or levels. In some embodiments, tiers may encompass one or more levels. For instance, in one embodiment, Tier-1 refers to levels 1 and 2. A second tier (Tier-2) may comprise level 3. In some embodiments, tiers may have a one-to-one correspondence with levels (e.g., Tier-1 equivalent to level 1, etc.). Note further that in some embodiments, Tier-2 pictures (e.g., third level pictures) may not be ascertained because the $\Delta PTS$ between consecutive Tier-1 pictures is small (e.g., if between two RAPs, have sufficient number of Tier-1 pictures (ascending PTS), do not perform Tier-2). Further, though described using three picture levels, one having ordinary skill in the art should appreciate that further levels are contemplated to be within the scope of the disclosed embodiments.

In some embodiments, a tracking of discontinuity (e.g., splices) is also employed.

At display time, and considering a trick mode operation such as fast forward, the fast forward speed and tier picture rate is used to determine which tier of pictures to display. The tier decision is revisited, in one embodiment, per GOP to be displayed. Once a tier is selected, all pictures on that tier and higher are played to ensure all references are satisfied.

Note that certain embodiments as described herein are independent of whether auxiliary information is communicated or not. From one point of view, an encoder has to adhere to what is communicated. Note that certain embodiments described herein are not limited to PVR. For instance, in some embodiments, network processing equipment may discard pictures because of network congestion, hence retaining top tier(s) pictures if the logic of such equipment "knew" that it was guaranteed that non-top tier pictures could be discarded and the top tier (which ever tier "n" it is) is guaranteed to be self decodable if all tier n pictures and above are retained. Additionally, in some embodiments, logic in such network equipment may perform the ascertaining methods described herein, hence obviating the need for encoding functionality in the DHCT to perform such functions.

Although the description has been described with respect to particular embodiments thereof, these particular embodiments are merely illustrative, and not restrictive. For example, although a specific application such as personal video recording has been described, it is possible to adapt features of the disclosed embodiments for other applications (e.g., video on demand). Although operations are described with respect to a "picture," any other collection of data may be similarly used such a group of pictures, a block, macroblock, slice or other picture portion, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit the invention to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

At least the following is claimed:

1. A method, comprising:
   receiving a video stream comprising a sequence of plural compressed pictures, wherein the plural compressed pictures comprises a plurality of sets of compressed pictures, wherein each set in the plurality of sets has a respective picture interdependency characteristic, wherein the compressed pictures in the first set depend for decoding only on pictures from the first set;
   determining an adherence of the first and second set of compressed pictures to one or more rules prior to decoding the compressed pictures, the rules comprising the picture interdependency characteristics; and
   decoding the first set, the second set, or a combination of both based on an adherence of the first set and the second set to the one or more rules.

2. The method of claim 1, further comprising receiving auxiliary information in a transport layer of the video stream, the auxiliary information conveying that the first and second compressed pictures in the video stream adhere to the one or more rules corresponding to one or more picture interdependency tiers.

3. The method of claim 1, further comprising receiving auxiliary information in the video stream, the auxiliary information conveying that the first and second compressed pictures adhere to the one or more rules of a subset of the one or more picture interdependency tiers.

4. The method of claim 1, further comprising receiving auxiliary information in the video stream, the auxiliary information comprising one or more data fields that identifies a particular picture interdependency tier scheme from a plurality of picture interdependency tier schemes, each of the schemes corresponding to a defined encoding scheme.

5. The method of claim 4, wherein at least one of the data fields comprises an indication of whether a particular picture interdependency tier or subset of a particular picture interdependency tier is a valid picture interdependency tier.

6. The method of claim 1, further comprising annotating received auxiliary information using a data structure associating each compressed picture to one or more of a corresponding first or second set, sequence parameter set, picture parameter set, and location of the compressed picture.

7. The method of claim 1, wherein the one or more rules adhered to by the first or second set of compressed pictures are unique to the adhering first or second set.

8. The method of claim 1, wherein the first set of compressed pictures comprise a first level of importance and the second set of compressed pictures comprise a second level of importance different than the first level of importance.

9. The method of claim 1, wherein the first set of compressed pictures comprises a higher level of importance than the second set.

10. The method of claim 1, further comprising:
    progressively extracting the first set of compressed pictures;
    decoding the first set independently of the second set; and
    outputting the first set independently of the second set.

11. The method of claim 10, wherein receiving further comprises receiving a third set of compressed pictures, the third set having a third relative level of importance lower than the first and second set.

12. The method of claim 11, further comprising:
    progressively extracting the first and second set of compressed pictures;
    decoding the first and second set independently of the third set; and
    outputting the first and second set independently of the third set.

13. A method, comprising:
    providing a video stream comprising a sequence of plural compressed pictures, including a first level and a second level of coded pictures, the first level exhibiting, when decoded, picture interdependencies different than those exhibited by a decoded second level; and
    providing auxiliary information in the video stream, the auxiliary information conveying that the first level of pictures adheres to a first set of rules and that the second level of coded pictures adheres to a second set of rules; and
    decoding the first level based on adherence of a first set of rules of the first picture interdependency level and process the second level based on the adherence of a second set of rules corresponding to the second picture interdependency level.

14. The method of claim 13, wherein the first set of rules is different that the second set of rules.

15. The method of claim 13, wherein the first set of rules corresponds to a first picture interdependency tier and the second set of rules corresponds to a second picture interdependency tier.

16. The method of claim 13, wherein providing the auxiliary information further comprises providing the auxiliary information as private data in an adaptation field of a transport layer of the video stream.

17. The method of claim 13, wherein providing the auxiliary information further comprises providing one or more data fields that identifies a particular picture interdependency tier scheme from a plurality of picture interdependency tier schemes, each of the schemes corresponding to a defined encoding scheme.

18. A system, comprising:
an encoding device configured to: provide a video stream comprising a sequence of plural compressed pictures, including a first level and a second level of coded pictures, the first level exhibiting, when decoded, picture interdependencies different than those exhibited by a decoded second level; and provide auxiliary information in a transport layer of the video stream, the auxiliary information conveying that the first level of pictures corresponds to a first picture interdependency tier and that the second level of pictures corresponds to a second picture interdependency tier; and
a receiving device configured to:
receive the video stream; and
process the first level based on adherence of a first set of rules of the first picture interdependency tier and process the second level based on the adherence of a second set of rules corresponding to the second picture interdependency tier.

19. The system of claim 18, wherein the first set of rules is different that the second set of rules.

20. The system of claim 18, wherein the auxiliary information is provided as private data in an adaptation field of the transport layer of the video stream.

\* \* \* \* \*